(12) United States Patent
Fletcher

(10) Patent No.: US 7,441,697 B2
(45) Date of Patent: *Oct. 28, 2008

(54) LIMITED USE PIN SYSTEM AND METHOD

(75) Inventor: Christopher John Fletcher, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/759,458

(22) Filed: Jun. 7, 2007

(65) Prior Publication Data

US 2007/0228161 A1    Oct. 4, 2007

Related U.S. Application Data

(62) Division of application No. 10/711,827, filed on Oct. 7, 2004.

(60) Provisional application No. 60/572,245, filed on May 17, 2004.

(51) Int. Cl.
*G06K 5/00* (2006.01)
*G06F 17/00* (2006.01)
*G06F 7/08* (2006.01)

(52) U.S. Cl. .................. 235/380; 235/375; 235/381; 235/382

(58) Field of Classification Search ......... 235/379–382; 705/26, 35, 39, 44, 65, 67, 75

See application file for complete search history.

(56) References Cited

U.S. PATENT DOCUMENTS 4,450,535 A    5/1984    dePommery et al.

(Continued)

FOREIGN PATENT DOCUMENTS

EP    1115095    7/2001

(Continued)

OTHER PUBLICATIONS

Green, Thomas C., "American Express offers temporary CC numbers for the Web", Sep. 9, 2000, The Register, www.theregister.c.uk/c.

(Continued)

*Primary Examiner*—Karl D Frech
*Assistant Examiner*—April A Taylor
(74) *Attorney, Agent, or Firm*—Snell & Wilmer L.L.P.

(57) ABSTRACT

The present invention facilitates transactions by providing a limited use PIN that is associated with a primary account and/or PIN number, wherein the limited use PIN is presented to the merchant to initiate a transaction. More particularly, the system involves the process of registering a user (if not already pre-registered) to participate in a transaction system; generating a limited use PIN and issuing this number to the user, where the user presents this number to a merchant to complete a sales transaction; the merchant processing this limited use PIN, where the number is typically presented to the credit issuer to facilitate authorization. Additionally, the limited use PIN may also carry with it certain limitations-on-use conditions, where the transaction is not authorized unless these conditions are met. In generating a limited use PIN, the issuer generates a random number and associates this number with the user's primary charge account.

18 Claims, 15 Drawing Sheets

U.S. PATENT DOCUMENTS

| | | |
|---|---|---|
| 5,016,274 A | 5/1991 | Micali et al. |
| 5,023,908 A | 6/1991 | Weiss |
| 5,034,597 A | 7/1991 | Atsumi et al. |
| 5,350,906 A | 9/1994 | Brody et al. |
| 5,453,601 A | 9/1995 | Rosen |
| 5,461,217 A | 10/1995 | Claus |
| 5,500,513 A | 3/1996 | Langhans et al. |
| 5,504,808 A | 4/1996 | Hamrick, Jr. |
| 5,577,120 A | 11/1996 | Penzias |
| 5,594,227 A | 1/1997 | Deo |
| 5,614,703 A | 3/1997 | Martin et al. |
| 5,621,787 A | 4/1997 | McKoy et al. |
| 5,641,050 A | 6/1997 | Smith et al. |
| 5,689,100 A | 11/1997 | Carrithers et al. |
| 5,715,399 A | 2/1998 | Bezos |
| 5,721,781 A | 2/1998 | Deo et al. |
| 5,724,424 A | 3/1998 | Gifford |
| 5,734,838 A | 3/1998 | Robinson et al. |
| 5,742,756 A | 4/1998 | Dillaway et al. |
| 5,742,845 A | 4/1998 | Wagner |
| 5,745,555 A | 4/1998 | Mark |
| 5,768,385 A | 6/1998 | Simon |
| 5,770,843 A | 6/1998 | Rose et al. |
| 5,778,069 A | 7/1998 | Thomlinson et al. |
| 5,814,796 A | 9/1998 | Benson et al. |
| 5,826,241 A | 10/1998 | Stein et al. |
| 5,826,242 A | 10/1998 | Montulli |
| 5,852,812 A | 12/1998 | Reeder |
| 5,862,325 A | 1/1999 | Reed et al. |
| 5,864,830 A | 1/1999 | Armetta et al. |
| 5,878,138 A | 3/1999 | Yacobi |
| 5,878,141 A | 3/1999 | Daly et al. |
| 5,883,810 A | 3/1999 | Franklin et al. |
| 5,884,280 A | 3/1999 | Yoshioka et al. |
| 5,892,827 A | 4/1999 | Beach et al. |
| 5,897,622 A | 4/1999 | Blinn et al. |
| 5,898,838 A | 4/1999 | Wagner |
| 5,903,830 A | 5/1999 | Joao et al. |
| 5,903,875 A | 5/1999 | Kohara |
| 5,903,880 A | 5/1999 | Biffar |
| 5,905,908 A | 5/1999 | Wagner |
| 5,909,492 A | 6/1999 | Payne et al. |
| 5,913,203 A | 6/1999 | Wong et al. |
| 5,914,472 A | 6/1999 | Foladare et al. |
| 5,915,023 A | 6/1999 | Bernstein |
| 5,918,216 A | 6/1999 | Miksovsky et al. |
| 5,923,734 A | 7/1999 | Taskett |
| 5,930,767 A | 7/1999 | Reber et al. |
| 5,930,777 A | 7/1999 | Barber |
| 5,949,044 A | 9/1999 | Walker et al. |
| 5,949,876 A | 9/1999 | Ginter et al. |
| 5,953,710 A | 9/1999 | Fleming |
| 5,956,699 A | 9/1999 | Wong et al. |
| 5,958,004 A | 9/1999 | Helland et al. |
| 5,960,411 A | 9/1999 | Hartman et al. |
| 5,963,915 A | 10/1999 | Kirsch |
| 5,966,697 A | 10/1999 | Fergerson et al. |
| 5,970,471 A | 10/1999 | Hill |
| 5,970,472 A | 10/1999 | Allsop et al. |
| 5,970,473 A | 10/1999 | Gerszberg et al. |
| 5,970,475 A | 10/1999 | Barnes et al. |
| 5,983,207 A | 11/1999 | Turk et al. |
| 5,984,180 A | 11/1999 | Albrecht |
| 5,991,413 A | 11/1999 | Arditti et al. |
| 5,991,748 A | 11/1999 | Taskett |
| 5,999,914 A | 12/1999 | Blinn et al. |
| 6,000,832 A | 12/1999 | Franklin et al. |
| 6,002,767 A | 12/1999 | Kramer |
| 6,009,412 A | 12/1999 | Storey |
| 6,012,143 A | 1/2000 | Tanaka |
| 6,014,634 A | 1/2000 | Scroggie et al. |
| 6,014,635 A | 1/2000 | Harris et al. |
| 6,014,636 A | 1/2000 | Reeder |
| 6,014,646 A | 1/2000 | Vallee et al. |
| 6,014,648 A | 1/2000 | Brennan |
| 6,014,650 A | 1/2000 | Zampese |
| 6,014,748 A | 1/2000 | Tushie et al. |
| 6,016,482 A | 1/2000 | Molinari et al. |
| 6,016,484 A | 1/2000 | Williams et al. |
| 6,018,718 A | 1/2000 | Walker et al. |
| 6,021,943 A | 2/2000 | Chastain |
| 6,023,510 A | 2/2000 | Epstein |
| 6,029,147 A | 2/2000 | Horadan et al. |
| 6,029,150 A | 2/2000 | Kravitz |
| 6,029,890 A | 2/2000 | Austin |
| 6,038,292 A | 3/2000 | Thomas |
| 6,038,551 A | 3/2000 | Barlow et al. |
| 6,041,308 A | 3/2000 | Walker et al. |
| 6,044,360 A | 3/2000 | Picciallo |
| 6,052,675 A | 4/2000 | Checchio |
| 6,058,418 A | 5/2000 | Kobata |
| 6,061,789 A | 5/2000 | Hauser et al. |
| 6,064,981 A | 5/2000 | Barni et al. |
| 6,065,675 A | 5/2000 | Teicher |
| 6,070,150 A | 5/2000 | Remington et al. |
| 6,070,154 A | 5/2000 | Tavor et al. |
| 6,076,078 A | 6/2000 | Camp et al. |
| 6,078,906 A | 6/2000 | Huberman |
| 6,078,908 A | 6/2000 | Schmitz |
| 6,081,790 A | 6/2000 | Rosen |
| 6,088,683 A | 7/2000 | Jalili |
| 6,088,717 A | 7/2000 | Reed et al. |
| 6,088,797 A | 7/2000 | Rosen |
| 6,092,198 A | 7/2000 | Lanzy et al. |
| 6,098,053 A | 8/2000 | Slater |
| 6,112,191 A | 8/2000 | Burke |
| 6,115,458 A | 9/2000 | Taskett |
| 6,122,625 A | 9/2000 | Rosen |
| 6,125,352 A | 9/2000 | Franklin et al. |
| 6,141,752 A | 10/2000 | Dancs et al. |
| 6,163,771 A | 12/2000 | Walker et al. |
| 6,173,269 B1 | 1/2001 | Solokl et al. |
| 6,182,895 B1 | 2/2001 | Albrecht |
| 6,189,787 B1 | 2/2001 | Dorf |
| 6,227,447 B1 | 5/2001 | Campisano |
| 6,267,292 B1 | 7/2001 | Walker et al. |
| 6,330,544 B1 | 12/2001 | Walker et al. |
| 6,336,095 B1 | 1/2002 | Rosen |
| 6,339,766 B1 | 1/2002 | Gephart |
| 6,405,182 B1 | 6/2002 | Cuervo |
| 6,473,500 B1 | 10/2002 | Risafi et al. |
| 6,526,130 B1 | 2/2003 | Paschini |
| 6,542,601 B1 | 4/2003 | Hernandez et al. |
| 6,581,827 B2 | 6/2003 | Welton |
| 6,609,654 B1 | 8/2003 | Anderson et al. |
| 6,636,833 B1 | 10/2003 | Flitcroft et al. |
| 6,705,519 B1 | 3/2004 | Goodwin, III |
| 6,834,270 B1 | 12/2004 | Pagani et al. |
| 6,845,906 B2 * | 1/2005 | Royer et al. ............... 235/379 |
| 6,901,387 B2 | 5/2005 | Wells et al. |
| 6,931,382 B2 * | 8/2005 | Laage et al. ............... 705/67 |
| 7,100,821 B2 | 9/2006 | Rasti |
| 7,136,835 B1 | 11/2006 | Flitcroft et al. |
| 2001/0034720 A1 * | 10/2001 | Armes ..................... 705/65 |
| 2001/0047335 A1 * | 11/2001 | Arndt et al. ................ 705/44 |
| 2002/0046341 A1 | 4/2002 | Kazaks et al. |
| 2002/0159601 A1 | 10/2002 | Bushmitch et al. |
| 2002/0174016 A1 | 11/2002 | Cuervo |
| 2002/0184143 A1 | 12/2002 | Khater |
| 2003/0001005 A1 | 1/2003 | Risafi et al. |
| 2003/0004889 A1 | 1/2003 | Fiala et al. |
| 2003/0018567 A1 | 1/2003 | Flitcroft et al. |
| 2003/0028481 A1 | 2/2003 | Flitcroft et al. |
| 2003/0053609 A1 | 3/2003 | Risafi et al. |

| | | | |
|---|---|---|---|
| 2003/0069846 | A1 | 4/2003 | Marcon |
| 2003/0078896 | A1 | 4/2003 | Fox |
| 2003/0095646 | A1 | 5/2003 | Paschini |
| 2004/0006539 | A1 | 1/2004 | Royer et al. |
| 2004/0083184 | A1 | 4/2004 | Tsuei et al. |
| 2005/0010483 | A1* | 1/2005 | Ling ............................ 705/26 |
| 2007/0198411 | A1* | 8/2007 | Kavanagh et al. ............. 705/44 |
| 2007/0284434 | A1* | 12/2007 | Fletcher ...................... 235/379 |

FOREIGN PATENT DOCUMENTS

| | | |
|---|---|---|
| GB | 2361790 | 10/2001 |
| WO | WO 97/09688 | 3/1997 |
| WO | WO 99/49424 | 9/1999 |
| WO | WO 00/49586 | 8/2000 |

OTHER PUBLICATIONS

CNN.com; U.S. News, "American Express to offer disposable credit card numbers", Sep. 8, 2000, Associated Press, www.cnn.c.

American Express, "Private PaymentsSM; A New Level of Security from American Express", American Express website, cards.

Martin, Zack; "One-Time Numbers Stop Web Hackers From Pilfering Data", Jan. 2001, Card Marketing, Thomson Financial, www.c rdf rum.c.

The Dollar Stretcher, "Disposable Credit Card Numbers", Jan. 2001, CardRatins.org, www.stretcher.c.

Gabber, et al., "Agora: A Minimal Distributed Protocol for Electronic Commerce", Nov. 18, 1996, USENIX Oakland, CA pp. 1, 8 and 9.

Lamond, "Credit Card Transactions Real World and Online" © 1996.

* cited by examiner

```
ARZPP  PRIVATE PAYMENT INQUIRY                              S-TSC6-03 09/26/00
ACCT: 0000 000000 00000   AMT:           MONTH:   YEAR:
                                              PLASTIC NO:

LIMITED USE PIN    EXP DT          CHG DT        CHARGE AMT   MAG SEQ NO CTR
       1234               2000-09-30      09/09/2000       48.59
       MERCHANT A
       9876               2000-09-30      09/09/2000       59.00

END OF DETAIL
```

FIG. 12

LIMITED USE PIN SYSTEM AND METHOD

CROSS-REFERENCE TO RELATED APPLICATIONS

This application is a divisional application of and claims priority to U.S. patent application Ser. No. 10/711,827 filed on Oct. 7, 2004 and entitled "LIMITED USE PIN SYSTEM AND METHOD," which application claims priority to U.S. Provisional Application No. 60/572,245, entitled "LIMITED USE PIN SYSTEM AND METHOD," filed on May 17, 2004, the contents of which are all incorporated herein by reference.

FIELD OF INVENTION

This application generally relates to a system for facilitating transactions utilizing a code (e.g., PIN) that is associated with a primary transaction instrument. More particularly, the system allows a cardholder to pay a merchant using a private, limited-use code. Moreover, the invention provides registration, code generation and association, authorization, settlement and customer service processes to achieve an improved secure and private transaction system.

BACKGROUND OF THE INVENTION

Various systems and methods exist for facilitating transaction card skimming in the payment card industry. In an attempt to minimize these and similar problems relating to transaction card fraud, banks and other transaction card institutions have increased efforts to explore various ways to provide customers with temporary transaction numbers to facilitate online transactions, where the actual transaction card is not disclosed to the merchant and/or any other third party. However, many transaction card authorization methods still include the use of a PIN. Potential thieves can use devices that readily intercept or copy PIN numbers entered into an ATM and/or gas-kiosks which are some of the most common and least secure skimming locations.

SUMMARY OF THE INVENTION

The present invention facilitates transactions between a first party (referred to herein as "user") and a second party (referred to herein as "merchant") by providing the user with a limited use PIN that is associated with a user's primary account and/or PIN number, wherein the user presents or transmits the limited use PIN to the merchant to initiate a transaction.

More particularly, the system involves the process of registering a user (if not already pre-registered) to participate in a transaction system; generating a limited use PIN and issuing this number to the user, where the user presents this number to a merchant to complete a sales transaction; the merchant processing this limited use PIN, similar to any other PIN, where the number is typically presented to the credit issuer to facilitate authorization. Throughout this process, the user's primary charge account number and/or PIN may never be passed to the merchant or any other third party. Additionally, the limited use PIN may also carry with it certain limitations-on-use conditions, where the transaction is not authorized unless these conditions are met. In generating a limited use PIN, which may be upon a user's request, the issuer generates a random number and associates this number with the user's primary charge account.

Various embodiments of the present transaction system incorporate, and improve upon, existing or developing technologies, such as, for example, non-currency based programs and loyalty systems, electronic lines of credit, online banking, response systems etc.

BRIEF DESCRIPTION OF THE DRAWINGS

A more complete understanding of the present invention may be derived by referring to the detailed description and claims when considered in connection with the figures, where like reference numbers refer to similar elements throughout the figures, and:

FIG. 4 is a web page screen shot of a issuer's exemplary online registration page for a transaction system;

Figure 6:
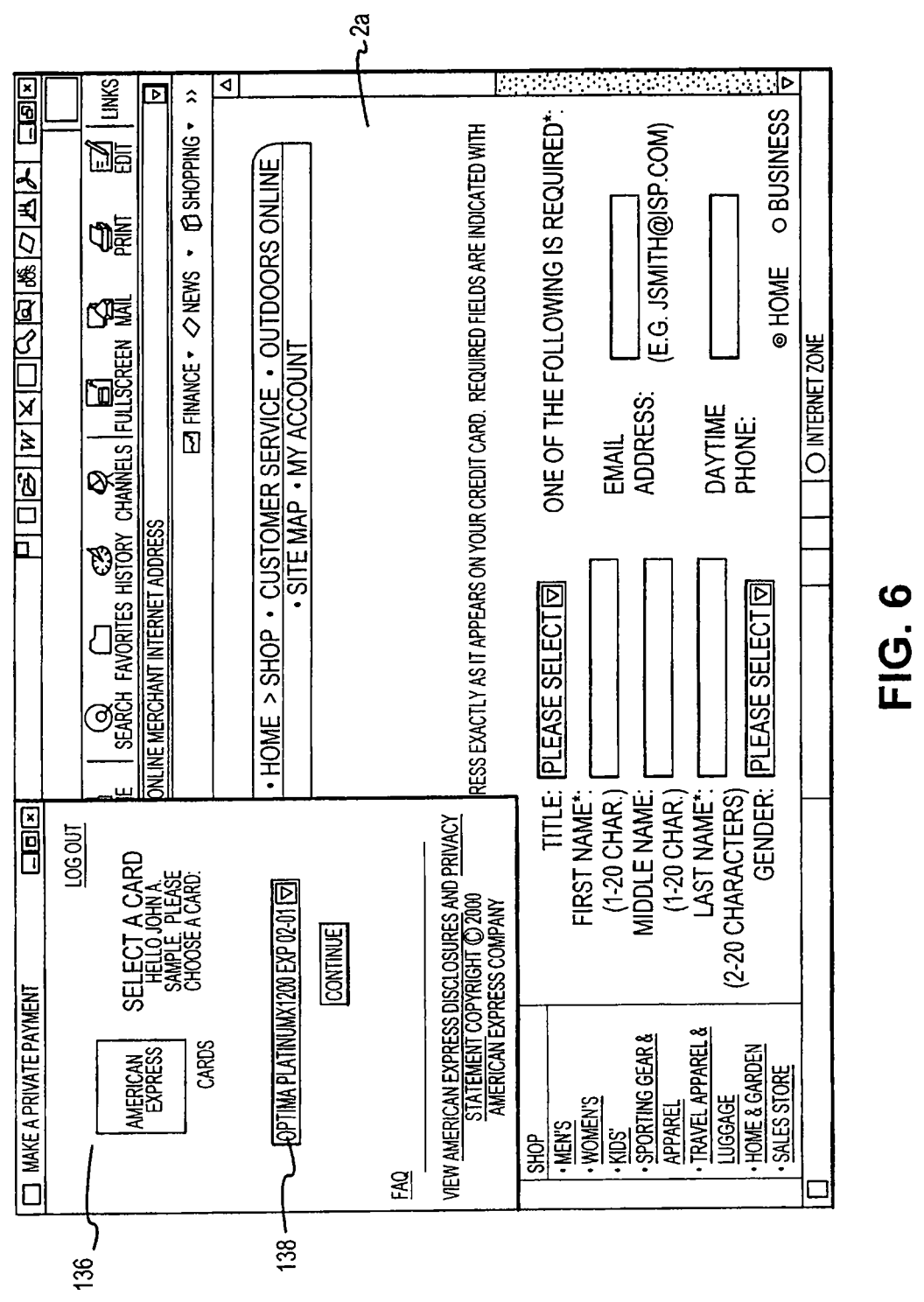

FIG. 6 is a web page screen shot of an issuer's exemplary online drop-down menu used to select a primary charge account in the foreground and an online merchant's payment web page in the background;

FIG. 12 is an screen shot of an exemplary transaction history report of the present invention;

DETAILED DESCRIPTION OF EXEMPLARY EMBODIMENTS

General Computing Information

Figure 1:
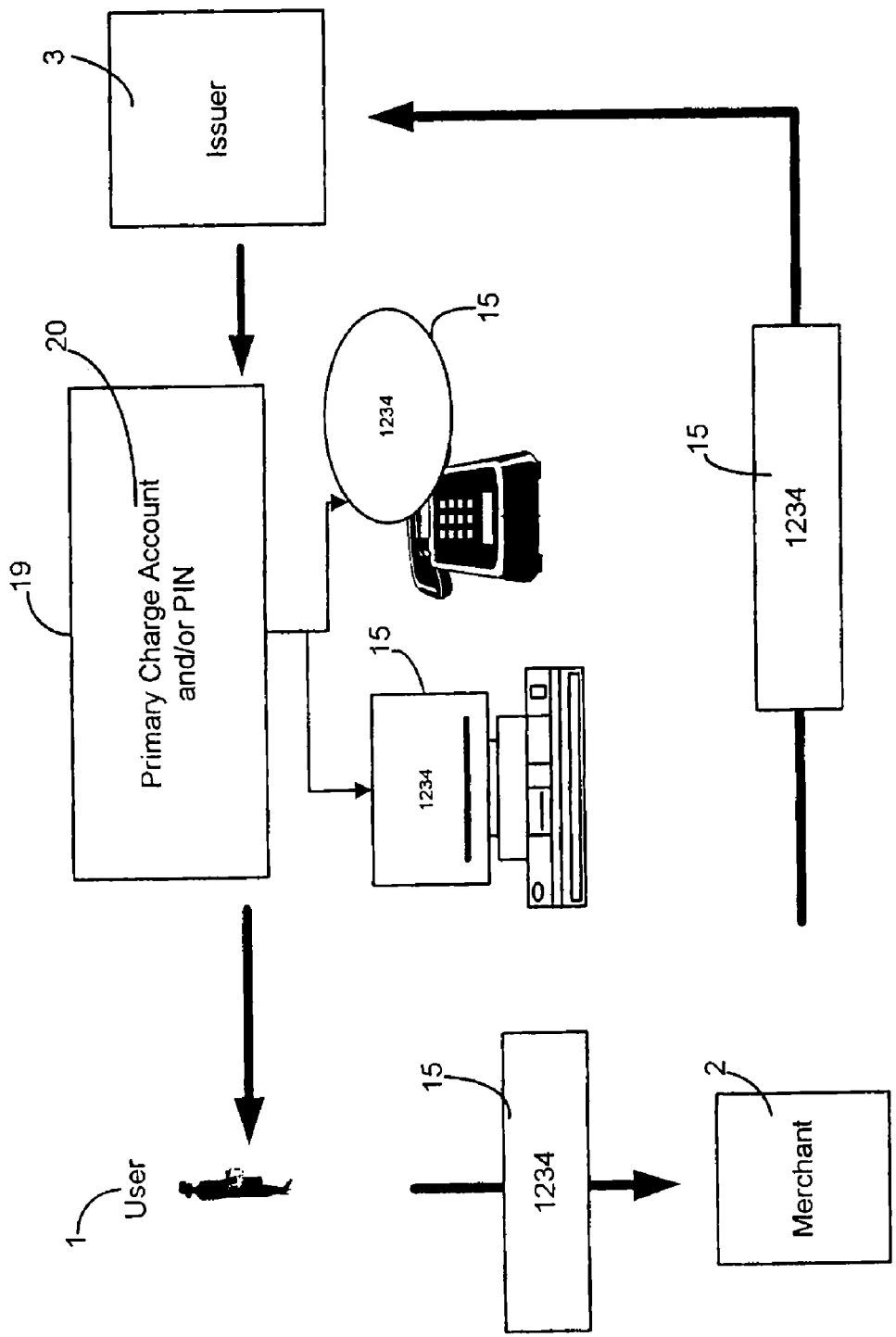
FIG. 1 is an overview of an exemplary system for facilitating a transaction.

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method descriptions may be executed in any order and are not limited to the order presented.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative and/or additional functional relationships and/or physical connections may be present in a practical system.

The various system computing components discussed herein may include one and/or more of the following: a host server and/or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. As those skilled in the art will appreciate, the computing systems may include an operating system (e.g., MVS, Windows NT, 95/98/2000/XP, OS2, UNIX, MVS, TPF, Linux, Solaris, MacOS, AIX, etc.) as well as various conventional support software and drivers typically associated with computers.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components (e.g., memory elements, processing elements, logic elements, look-up tables, and the like), which may carry out a variety of functions under the control of one and/or more microprocessors and/or other control devices. Similarly, the software elements of the present invention may be implemented with any programming and/or scripting language such as C, C++, Java, COBOL, assembler, PERL, Visual Basic, SQL Stored Procedures, extensible markup language (XML), with the various algorithms being implemented with any combination of data structures, objects, processes, routines and/or other programming elements. Further, it should be noted that the present invention may employ any number of conventional techniques for data transmission, signaling, data processing, network control, and the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography," by Jonathan Knudson, published by O'Reilly & Associates (1998); (3) "Cryptography & Network Security: Principles & Practice," by William Stallings, published by Prentice Hall; all of which are hereby incorporated by reference.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, and/or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described herein with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, may be implemented by computer program instructions. These computer program instructions may be loaded onto a general purpose computer, special purpose computer, and/or other programmable data processing apparatus to produce a machine, such that the instructions that execute on the computer and/or other programmable data processing apparatus create means for implementing the functions specified in the flowchart block and/or blocks.

These computer program instructions may also be stored in a computer-readable memory that may direct a computer and/or other programmable data processing apparatus to function in a particular manner, such that the instructions stored in the computer-readable memory produce an article of manufacture including instruction means which implement the function specified in the flowchart block and/or blocks. The computer program instructions may also be loaded onto a computer and/or other programmable data processing apparatus to cause a series of operational steps to be performed on the computer and/or other programmable apparatus to produce a computer-implemented process such that the instructions which execute on the computer and/or other programmable apparatus provide steps for implementing the functions specified in the flowchart block and/or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, may be implemented by either special purpose hardware-based computer systems which perform the specified functions and/ or steps, and/or suitable combinations of special purpose hardware and computer instructions.

Any of the communications, inputs, storage, databases and/or displays discussed herein may be facilitated through a website having web pages. The term "web page" as it is used herein is not meant to limit the type of documents and applications that may be used to interact with the user. For example, a typical website may include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service that receives a request from a browser that includes a URL (http://yahoo.com/stockquotes/ge) and an IP address (123.56.789). The web service retrieves the appropriate web pages and sends the web pages to the IP address.

Definitions

A "code", "PIN" (personal identification number), "account" and/or "account number", as used herein, may include any device, code, number, letter, symbol, digital certificate, smart chip, digital signal, analog signal, biometric and/or other identifier/indicia suitably configured to allow the user to access, interact with and/or communicate with the system such as, for example, one and/or more of an authorization/access code, personal identification number (PIN), Internet code, other identification code, and/or the like, which may optionally be located on and/or associated with a rewards card, charge card, credit card, debit card, prepaid card, telephone card, smart card, magnetic stripe card, bar code card, transponder, radio frequency card and/or an associated account. The account number may be distributed and stored in any form of plastic, electronic, magnetic, radio frequency, transponder, wireless, satellite, audio and/or optical device capable of transmitting and/or downloading data from itself to a second device. An account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type, etc. In this example, the last (sixteenth) digit is used as a sum check for the sixteen-digit number. The intermediary eight-to-ten digits are used to uniquely identify the cardholder. A merchant account number may be, for example, any number and/or alpha-numeric characters that identifies a particular business or charity for purposes of card acceptance, account reconciliation, reporting, and/or the like.

Furthermore, the merchant and the provider, described herein, may represent individual people, entities, and/or business, and while reference is made to American Express®, and/or any other credit account provider, this is by way of example and the financial authorization entity may represent various types of card issuing institutions, such as banks, credit card companies, card sponsoring companies, and/or third-party issuers under contract with financial institutions. The payment network may include existing proprietary networks that presently accommodate transactions for credit cards, debit cards, and other types of financial/banking cards, such as, for example, the American Express®, and VisaNet® network.

Merchant systems may include any suitable hardware and/or software described herein configured to allow a merchant to accept a transaction account payment and communicate over a network. For example, merchant systems may include a standard personal computer (PC) comprising a CPU, monitor, storage, keyboard, mouse, and communication hardware appropriate for the given data link (e.g., V.90 modem, network card, cable modem, etc.). In alternate embodiments, merchant systems are personal data assistants (PDAs) capable of manipulating images and communicating with transaction system. Merchant systems may also include application software configured to communicate over a network, for example, a world wide web (WWW) browser and/or any other communication software. In an exemplary embodiment, merchant systems may include point-of-sale terminals which communicate over a payment network discussed herein and/or via a conventional Internet browser application that operates in accordance with HTML and HTTP protocols such as Netscape Navigator (available from the Netscape Corporation of Mountain View, Calif.) and/or Microsoft Internet Explorer (available from the Microsoft Corporation of Redmond, Wash.).

A variety of conventional communications media and protocols may be used for data links. Such links may include, for example, a connection to an Internet Service Provider (ISP) over the local loop as is typically used in connection with standard modem communication, cable modem, Dish networks, ISDN, Digital Subscriber Line (DSL), and/or various wireless communication methods. Merchant systems may also reside within a LAN that interfaces to a network via a leased line (T1, D3, etc.). Such communication methods are well known in the art, and are covered in a variety of standard texts. See, e.g., GILBERT HELD, UNDERSTANDING DATA COMMUNICATIONS (1996), hereby incorporated by reference. It is noted that the network may be implemented as other types of networks, such as an interactive television (ITV) network. Moreover, the system contemplates the use, sale and/or distribution of any goods, services and/or information over any network having similar functionality described herein. While an exemplary embodiment of the invention is described in association with a transaction system, the invention contemplates any type of networks and/or transaction systems, including, for example, unsecure networks, public networks, wireless networks, closed networks, open networks, intranets, extranets, and/or the like.

While the terms "credit card accounts" and/or "credit card" may be used in the exemplary embodiments, the invention contemplates the use of any type of financial and/or transaction account. As used herein, a "transaction card" may include any account used for financial and/or value transactions wherein the account may and/or may not be associated with a physical card, such as a charge card, credit card, debit card, smart card, bar-coded card, magnetic stripe card, transponder, account number, Internet account, Internet card, personal digital assistant account, digital wallet account, airline card, mall card, frequent shopper card, brokerage account, 401K plan, stock account, telephone account, utility account, loyalty point account, and/or the like. One such transaction account, which is suitable for use with this invention, is the account described by Bishop et al., in the U.S. patent application Ser. No. 09/652,899, entitled "METHODS AND APPARATUS FOR CONDUCTING ELECTRONIC TRANSACTIONS," filed Aug. 31, 2000, which is herein incorporated in its entirety by reference.

As used herein, the term network may include any electronic communications means which incorporates both hardware and software components of such. Communication among the parties in accordance with the present invention may be accomplished through any suitable communication channels, such as, for example, a telephone network, an extranet, an intranet, Internet, point-of-interaction device (point-of-sale device, personal digital assistant, cellular phone, kiosk, Automatic Teller Machine (ATM), etc.), online communications, off-line communications, wireless communications, transponder communications, local area network (LAN), wide area network (WAN), networked and/or linked devices and/or the like. Moreover, although the invention is frequently described herein as being implemented with TCP/IP communications protocols, the invention may also be implemented using IPX, Appletalk, IP-6, NetBIOS, OSI and/or any number of existing and/or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997), the contents of which are hereby incorporated by reference.

System Description

As depicted in FIG. 1, the present invention generally relates to a transaction system where a first party to a transaction ("user 1") provides to a second party to a transaction ("merchant 2") a Limited Use PIN (LUP) 15. The LUP may be generated by an issuer 3 or may be created by the user 1. In an exemplary embodiment, although not required, LUP 15 is immediately usable by user 1 without need for activation and may have associated therewith user 1, issuer 3, and/or merchant 2 defined conditions and/or parameters of use restrictions which limit use of the LUP 15. A "transaction," as defined herein, includes, inter alia, any exchange and/or delivery of value, exchange and/or delivery of data, gifting of value and/or data, etc. The term "transaction" not only contemplates an exchange of goods and/or services for value from one party to another, but also the gifting of something from one party to another. Additionally, transaction and/or charge card numbers are account numbers that are used to facilitate any type of transaction.

The first party to the transaction (referred to herein as "user 1") may be any individual, business, software, hardware and/or other entity that uses a LUP 15 to facilitate any transaction. In an exemplary embodiment, user 1 establishes a new and/or has an existing relationship and/or association with issuer 3. For example, in one embodiment, user 1 may be an American Express® card member. In another embodiment, user 1 may be a participant in a frequent flyer rewards program. In a further embodiment, user 1 may be a member of any suitable organization that provides transaction products and/or services. Another embodiment contemplates the cardholder gifting a limited use PIN to a second party. The term user 1 may also be referred to herein as "consumer," "card member," "participant," "cardholder," "customer" and/or the like.

The second party to the transaction (referred to herein as "merchant 2") is any individual, business, software, hardware, website, online vendor, off line vendor and/or other entity that receives a limited use PIN, whether and/or not in exchange for goods and/or services. For example, in one embodiment, merchant 2 may be an online bookstore such as Amazon.com®. In another embodiment, merchant 2 may be a local plumber. In yet another embodiment, merchant 2 may be a local hardware store. In some instances, user 1 and merchant 2 may be the same. In other situations, merchant 2 and issuer 3 are the same. Although referred to herein as a "merchant," this term contemplates situations where any second party receives a limited use PIN from the first party: such as, for example, where user 1 gifts a limited use PIN to another party.

The issuer ("issuer 3") includes any provider of products and/or services that facilitates any type of transaction. As contemplated by an exemplary embodiment of the present invention, issuer 3 establishes and maintains account and/or transaction information for user 1. Issuer 3 may issue products to user 1 and may also provide both user 1 and merchant 2 with the processes to facilitate the transaction system of the present invention. Issuer 3 may include banks; credit unions; credit, debit and/or other transaction-related companies, telephone companies; and/or any other type of card and/or account issuing institutions, such as card-sponsoring companies, incentive and/or loyalty rewards companies, and/or third-party providers under contract with financial institutions. Unless otherwise specifically set forth herein, although referred to as "account provider," this term should be understood to mean any entity issuing any type of account to facilitate any transaction, exchange and/or service; and should not be limited to companies possessing and/or issuing physical cards. In an exemplary system, issuer 3 may be any transaction facilitating company such as a charge account provider like American Express®, VISA®, Mastercard®, Discover®, etc. In another embodiment, issuer 3 could be any membership organization and/or union. In some instances, issuer 3 and merchant 2 may be the same, for example, where the LUP 15 is issued by the same entity that provides the product and/or service. A LUP 15 phone card issued by a telephone company, where LUP 15 phone card is associated with a primary telephone account is one example.

An exemplary LUP 15 is any transaction number, code, symbol, indicia, PIN, etc., that is associated with another number and/or account that has been designated by user 1 and/or issuer 3 as a primary charge account (PCA 20) (i.e., primary account number, primary PIN number). In an exemplary embodiment, LUP 15 is a purchasing number that acts as a PIN and is associated with PCA 20. In an exemplary embodiment, PCA 20 account is not directly identified by LUP 15. In certain embodiments, PCA 20 account may have some identifying elements related to LUP 15. PCA 20 is defined herein to include any type of transaction account that references any account, membership, affiliation and/or association. For example, PCA 20 may be any charge account, such as a main charge card, credit, debit card and/or other account, such as a bank and/or brokerage account, reward program account, flexible spending account, etc. When more than one user 1 account exists, PCA 20 is the account that has been designated by user 1 and/or issuer 3 as the primary account. Alternatively, there may be a hierarchy of accounts where LUP 15 is associated with one and/or more PCAs 20 in a designated order. Additionally, as depicted in at least one embodiment described herein, LUP 15 may be associated with two and/or more accounts. For example, LUP 15 could be associated with a non-currency based account and also PCA 20.

While LUP 15 may be described herein as a limited use PIN or code, LUP 15 may be configured as any type of limited use code, ID, number, account or the like. For example, the present invention contemplates LUP 15 configured as a single use ID as described by Glazer et al., in the U.S. patent application Ser. No. 10/804,429, entitled "SINGLE USE USER IDS," filed Mar. 18, 2004 and incorporated herein by reference.

In an exemplary embodiment involving credit, debit and/or other banking cards, LUP 15 has the same or similar industry standard format that is used for regular PINs (e.g., four or more digit numbers). In exemplary embodiments, the numbers are formatted such that one is unable to tell the difference between LUP 15 and a regular PIN.

In an exemplary embodiment, LUP 15 is randomly and instantaneously generated by the issuer 3, usually upon a user's request, and can be distributed to user 1 by a variety of methods (online, telephone, wireless, email, regular mail, etc.) all of which should be secure and dependent upon verification of the user's identity. In an exemplary embodiment, although not required, LUP 15 is immediately active (and usable) once it is associated with the user's designated PCA 20 and provided to user 1. This feature minimizes the possibility that merchant 2 will receive a PIN that will be worthless because it was not properly activated by user 1, a third party, an issuer, and/or any other party. While the present invention may contemplate a previously allocated pool of numbers that needs to be activated, an exemplary embodiment of the present invention includes LUPs 15 that are instantaneously and randomly generated, and are usable upon receipt by user 1 without the need for separate activation.

In another exemplary embodiment, LUP 15 may have limited-use (and/or conditions-of-use) parameters associated with it by either user 1, merchant 2, and/or issuer 3 in order for the numbers to be restricted for particular uses. Alternatively, user 1 is able to choose system default parameters of use. Parameters may include, for example: (i) use of LUP 15 is good for a predetermined number of transactions (e.g., one, two, three, etc. transactions before the LUP is declined; (ii) cardholder-determined expiration dates (i.e., LUP 15 will be generated with expiration dates that are associated but unrelated to the expiration date of the user's PCA 20 number, other than that it cannot exceed the expiration date of PCA 20 account); (iii) limiting use of LUP 15 to a specified dollar amount, dollar amount per transaction, total dollar amount for pro-designated number of transactions, maximum dollar amount per month, etc.; (iv) use of LUP 15 for a specified merchant only; (v) restricting use to a specified user, other than primary cardholder (e.g., child, spouse, gift recipient, etc.); and/or (vi) any combination of these and/or similar features, for example, a number can be used at a specified merchant only for a pro-designated number of transactions and for a maximum dollar amount. In an exemplary online embodiment, user 1 may desire to require all online transactions (e.g., purchases) be performed using only LUPs, and/or alternatively, be performed only with specific merchants as defined. If the cardholder (and/or another individual) uses a physical charge card number for an online payment in violation of this condition, issuer 3 may decline the authorization.

These parameters not only provide increased security, allowing user 1 to tailor LUP 15 to a particular use, but an ancillary benefit is the ability of a cardholder to select conditions to control spending for themselves and/or others who have registered eligibility or authority to use the card (e.g., spouse, children, etc.). These conditions may include: restrictions (user 1 may choose to restrict use on certain sites and/or can pre-approve spending at particular sites); date range (user 1 can select a period of time when transactions may occur); maximum budget amount (user 1 can pre-set spending limits within certain periods of time and/or in certain categories (e.g., groceries, books, clothing)); credit and balance availability (user 1 can check credit and/or demand deposit balance availability prior to transacting); non-currency based accounts, such as Reward Points as Currency (user 1 can use reward points (e.g., Membership Rewards™, Blue Loot™) as currency to pay for purchases); and Gift Products (user 1 can use PCA 20 via LUP 15 to fund gift products to others for designated amounts).

Figure 2:
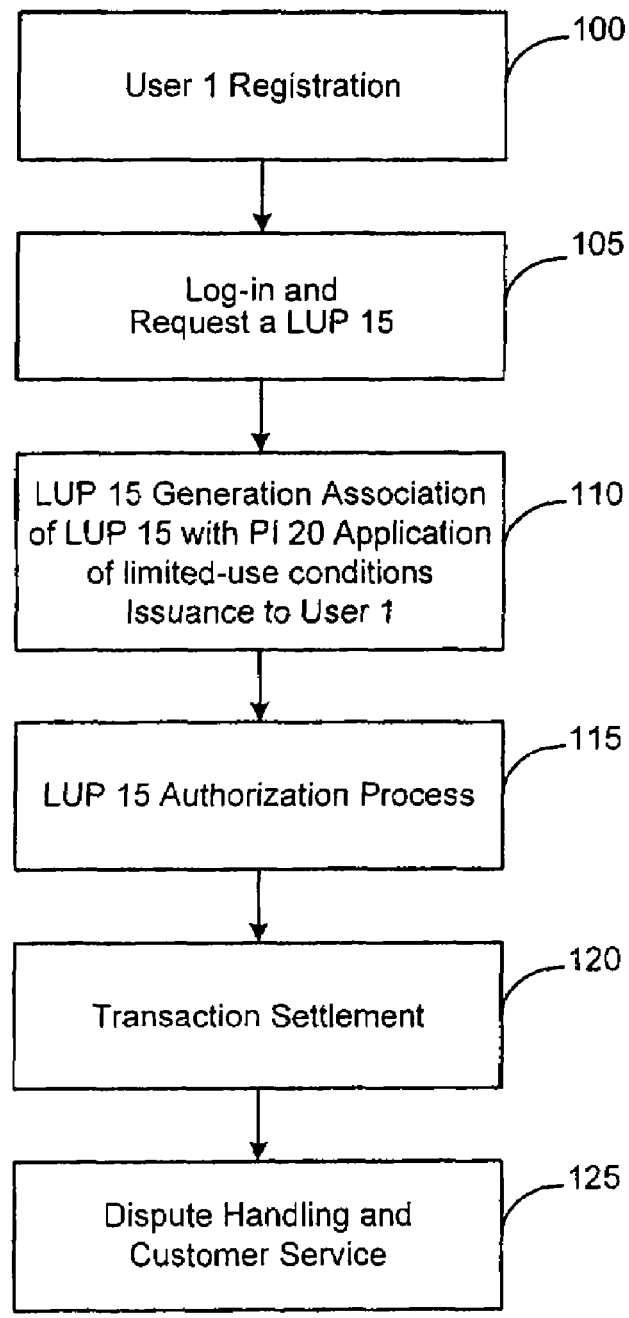
FIG. 2 is a flow diagram of exemplary processes of the present invention.

As shown in FIG. 2, an exemplary embodiment of the present invention includes steps for: (i) registering user 1 to use the account provider's 3 transaction services (step 100); (ii) receiving from user 1 a request for LUP 15 (step 105); (iii) generating LUP 15, associating LUP 15 with PCA 20, applying limited-use conditions, if desired, and issuing LUP 15 to user 1 (step 110); (iv) processing a merchant's 2 authorization request involving LUP 15 to determine if use of the LUP is authorized (step 115); (v) processing a settlement request, paying the merchant, and billing user 1 (step 120); and (vi) handling disputes and other customer service issues from the merchant and/or cardholder relating to use of LUP 15 (step 125).

Figure 8:
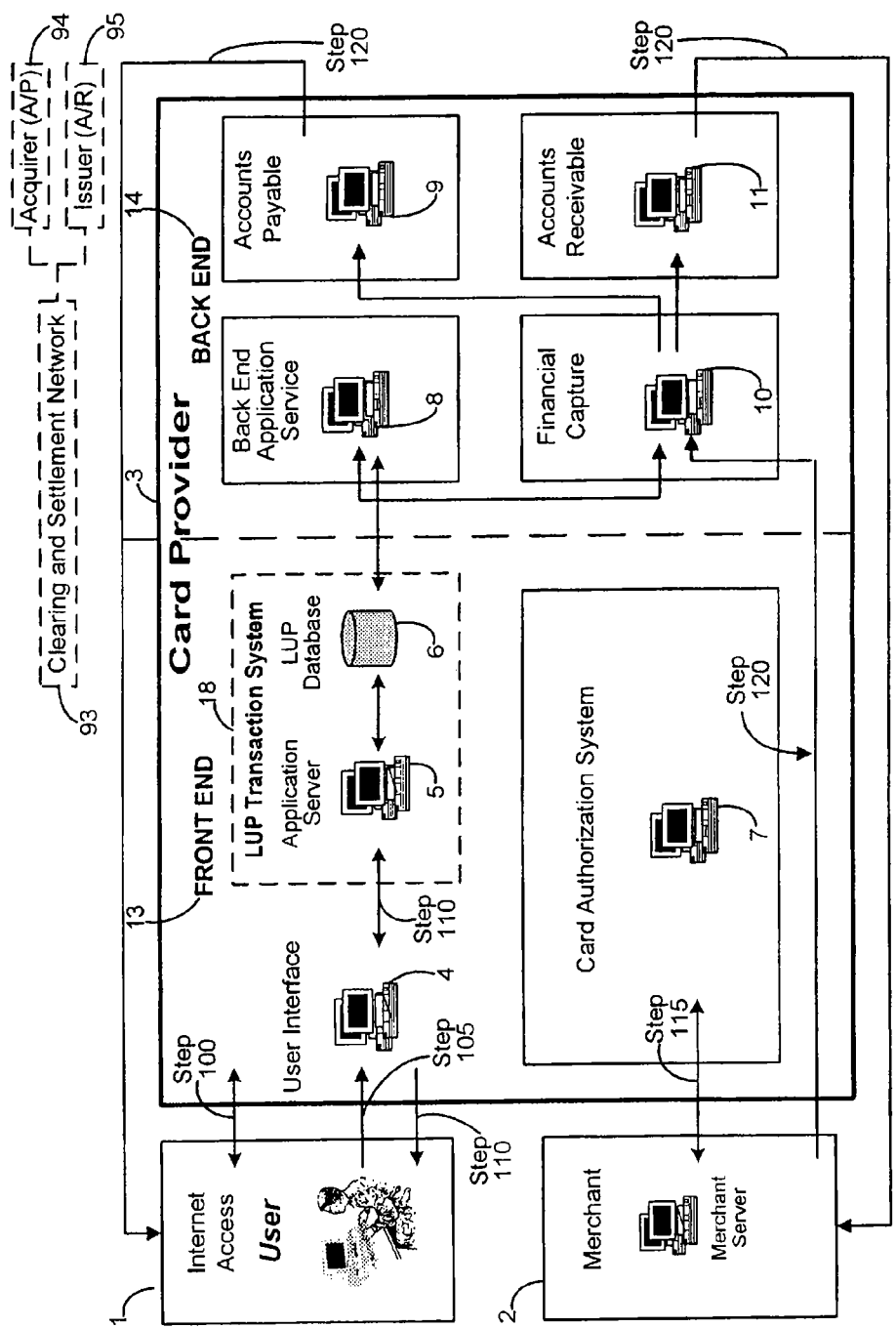
FIG. 8 is a block diagram of exemplary components of the present invention.

FIG. 8 depicts an overview of the components of an exemplary transaction system. In general, the account provider's computer system utilizes front end 13 and back end 14 processing systems. Front end 13 system includes, for example, a user interface system 4 (e.g., web server, IVR, etc.), an application server 5, a LUP database 6, and a card authorization system (CAS) 7. Application server 5 and LUP database 6 may, at times, be referred to collectively as the LUP transaction system (and/or service) 18. Referencing FIGS. 2 and 8, these front end 13 components facilitate (i) cardholder registration (step 100), (ii) request for a LUP 15 (step 105), (ii) generation and issuance of LUP 15 (step 110), and (iv) the LUP authorization process (step 115). Back end 14 system includes, for example, a financial capture system 10, a back end application service 8, an accounts payable system 9 and an accounts receivable system 11. Again referencing FIGS. 2 and 8, back end 14 components facilitate transaction settlement (step 120). In an exemplary system, the dispute handling and customer service processes (step 125) include, for example, in addition to the above mentioned systems, a system for identifying PCA 20 from LUP 15, a letter generating system for sending dispute inquiries to users 1 and merchants 2, and a system that accepts incoming communication from merchants 2 and converts LUP 15 received to PCA 20 for the purpose of facilitating the dispute handling process. More specifically, as shown in FIG. 8, issuer 3 user interface system 4 provides user 1 with access to the account provider's transaction services. It is through this interface that user 1 may register with the issuer 3, may request LUP 15, and, in response thereto, will receive from issuer 3 LUP 15 that is associated with his PCA 20. Front end 13 system also utilizes at least one application server 5 that processes incoming information, applies the appropriate business rules/condition sets as necessary, and generates appropriate outgoing responses. Application server 5 is configured to support interaction with, for example, user interface system 4 and LUP database 6. An exemplary LUP database 6 is a relational database comprising various tables for managing and translating a variety of information, such as user 1 profiles, charge card data, transaction data, merchant data, conditions/rules set profiles, etc.

Various databases used herein may include, for example, merchant data, financial institution data, and/or like data useful in the operation of the present invention. In other embodiments, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation, (Redwood Shores, Calif.), Microsoft Access and/or Microsoft SQL Server by Microsoft Corporation (Redmond, Wash.), and/or any other suitable database product. Moreover, the databases may be organized in any suitable manner, for example, as data tables and/or lookup tables. Each record may be a single file, a series of files, a linked series of data fields and/or any other data structure. Association of certain data may be accomplished through any desired data association technique such as those known and/or practiced in the art. For example, the association may be accomplished either manually and/or automatically. Automatic association techniques may include, for example, a database search, a database merge, GREP, AGREP, SQL, and/or the like. The association step may be accomplished by a database merge function, for example, using a "key field" in pre-selected databases and/or data sectors.

More particularly, a "key field" partitions the database according to the high-level class of objects defined by the key field. For example, certain types of data may be designated as a key field in a plurality of related data tables and the data tables may then be linked based on the type of data in the key field. In this regard, the data corresponding to the key field in each of the linked data tables may be the same and/or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one and/or more elementary files containing one and/or more data sets; using data sets stored in individual files using a hierarchical filing system; data sets stored as records in a single file (including compression, SQL accessible, hashed via one and/or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information may be stored in a storage space associated with a data set. As discussed above, the binary information may be stored on the financial transaction instrument and/or external to but affiliated with the financial transaction instrument. The BLOB method may store data sets as ungrouped data elements formatted as a block of binary via a fixed memory offset using either fixed storage allocation, circular queue techniques, and/or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first issuer, a second data set which may be stored may be provided by an unrelated second issuer, and yet a third data set which may be stored, may be provided by a third issuer unrelated to the first and second issuer. Each of these three exemplary data sets may contain different information that is stored using different data storage formats and/or techniques. Further, each data set may contain subsets of data that also may be distinct from other subsets.

As stated above, in various embodiments of the present invention, the data may be stored without regard to a common format. However, in one exemplary embodiment of the present invention, the data set (e.g., BLOB) may be annotated in a standard manner when provided for manipulating the data onto the financial transaction instrument. The annotation may comprise a short header, trailer, and/or other appropriate indicator related to each data set that is configured to convey information useful in managing the various data sets. For example, the annotation may be called a "condition header", "header", "trailer", and/or "status", herein, and may comprise an indication of the status of the data set and/or may include an identifier correlated to a specific issuer and/or owner of the data. In one example, the first three bytes of each data set BLOB may be configured and/or configurable to indicate the status of that particular data set (e.g., LOADED, INITIALIZED, READY, BLOCKED, REMOVABLE, and/or DELETED). Subsequent bytes of data may be used to indicate for example, the identity of the issuer, user, transaction/membership account identifier and/or the like. Each of these condition annotations is further discussed herein.

The data set annotation may also be used for other types of status information as well as various other purposes. For example, the data set annotation may include security information establishing access levels. The access levels may, for example, be configured to permit only certain individuals, levels of employees, companies, and/or other entities to access data sets, and/or to permit access to specific data sets based on the transaction, charity, issuer, donor and/or the like. Furthermore, the security information may restrict/permit only certain actions such as accessing, modifying, and/or deleting data sets. In one example, the data set annotation indicates that only the data set owner and/or the donor are permitted to delete a data set, various identified charities are permitted to access the data set for reading, and others are altogether excluded from accessing the data set. However, other access restriction parameters may also be used allowing various entities to access a data set with various permission levels as appropriate.

The data, including the header and/or trailer may be received by a stand-alone interaction device configured to add, delete, modify, and/or augment the data in accordance with the header and/or trailer. As such, in one exemplary embodiment, the header and/or trailer is not stored on the transaction device along with the associated issuer-owned data but instead the appropriate action may be taken by providing to the transaction instrument user at the stand-alone device, the appropriate option for the action to be taken. However, the present invention contemplates a data storage arrangement wherein the header and/or trailer, and/or header and/or trailer history, of the data is stored on the transaction instrument in relation to the appropriate data.

One skilled in the art will also appreciate that, for security reasons, any databases, systems, devices, servers and/or other components of the present invention may consist of any combination thereof at a single location and/or at multiple locations, wherein each database and/or system includes any of various suitable security features, such as firewalls, access codes, encryption, decryption, compression, decompression, and/or the like.

The computers discussed herein may provide a suitable website and/or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access and/or Microsoft SQL Server, Oracle, Sybase, Informix MySQL, InterBase, etc., may be used to provide an Active Data Object (ADO) compliant database management system.

Figure 9:
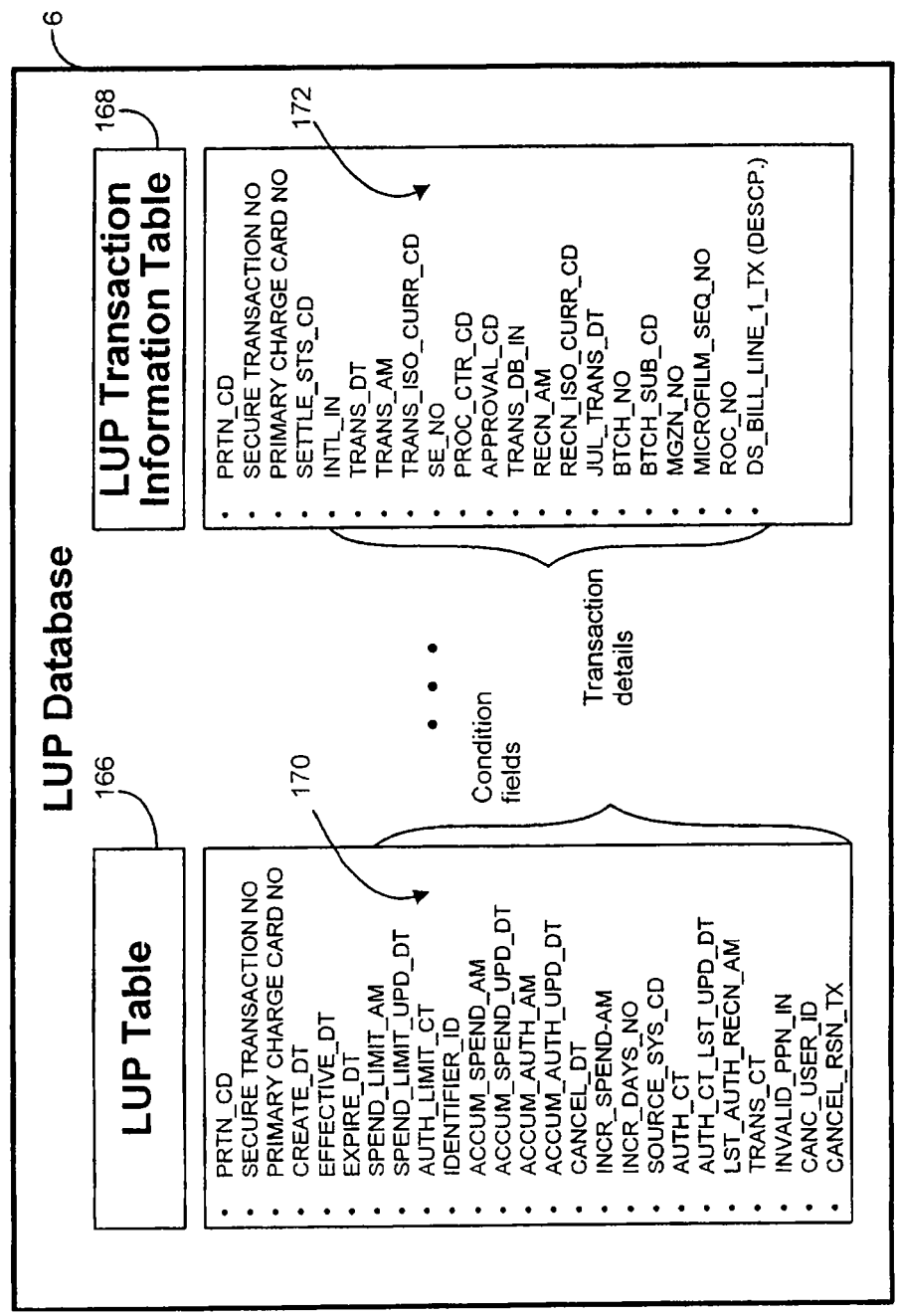
FIG. 9 is a block diagram of an example of some of the exemplary data structure of the LUP database of the present invention.

FIG. 9 illustrates two examples of exemplary tables within LUP database 6. LUP table 166 may contain a variety of database fields 170 relating to the user's LUP account. These fields may contain, in addition to general LUP 15 and PCA 20 account information, the business rule/condition set profiles associated with use of LUP 15. A LUP Transaction Information Table 168 contains database fields 172 for storing information relating to a particular transaction. As one skilled in the art can appreciate, the processing mechanisms and data structure methods can be structured in a variety of ways. In short, user interface system 4, application server 5, and LUP database 6 are suitably connected to facilitate the generation and issuance of LUP 15 and are further associated with card authorization system (CAS) 7, in order to process from merchant 2 an authorization request involving LUP 15.

When processing a merchant's request for settlement (i.e., to be paid for a transaction), financial capture (FINCAP) 10 system receives and captures the financial information (e.g., transaction amount, date, merchant identification (SE) number, LUP 15, etc.). The back end application service 8 interfaces with LUP transaction system 18, as necessary, to determine if the number is a valid LUP 15 (i.e., not a fraudulent number) and/or if PCA 20 associated with LUP 15 is also valid. If LUP 15 and/or PCA 20 is valid, AP system 9 pays the merchant 2. LUP database 6 is updated to reflect the transaction information. LUP transaction system 18 (and/or alternatively the back end application service 8) may substitute PCA 20 number for LUP 15 and forwards to the AR system 11 for billing.

Figure 11:
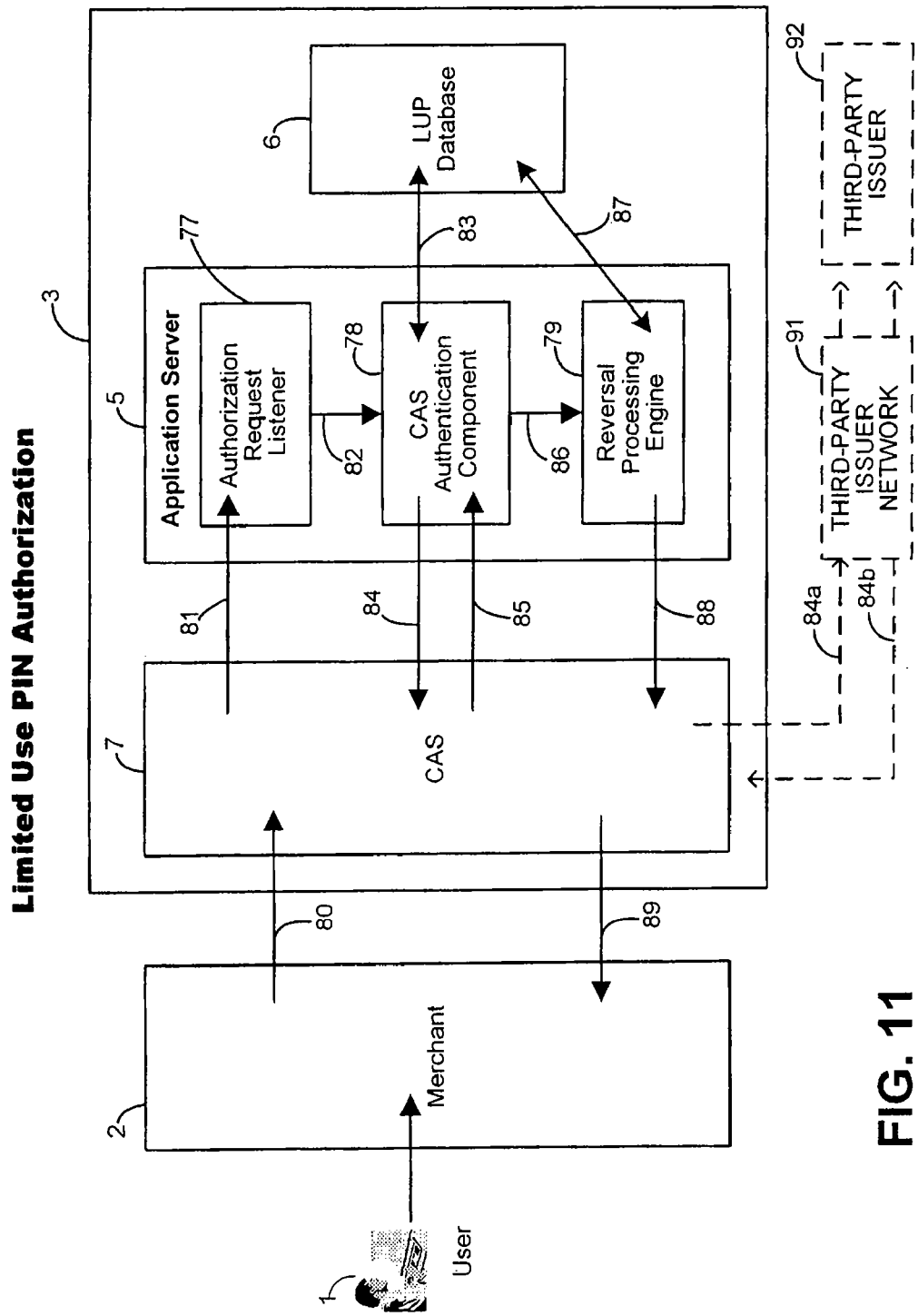
FIG. 11 is a flow diagram of an exemplary transaction authorization phase of the present invention.

Although the present system for facilitating transactions may exist within one account provider system, exemplary embodiments contemplate use with other third-party authorization and settlement systems and networks. FIGS. 8 and 11, for example, depict third-party authorization networks (FIGS. 11, 91 and 92) and settlement networks (FIGS. 8, 93-95) that may be integrated to form parts and/or processes of the present invention. Exemplary processes of the present invention are discussed in greater detail below.

Registration (FIG. 2, step 100)

Figure 3:
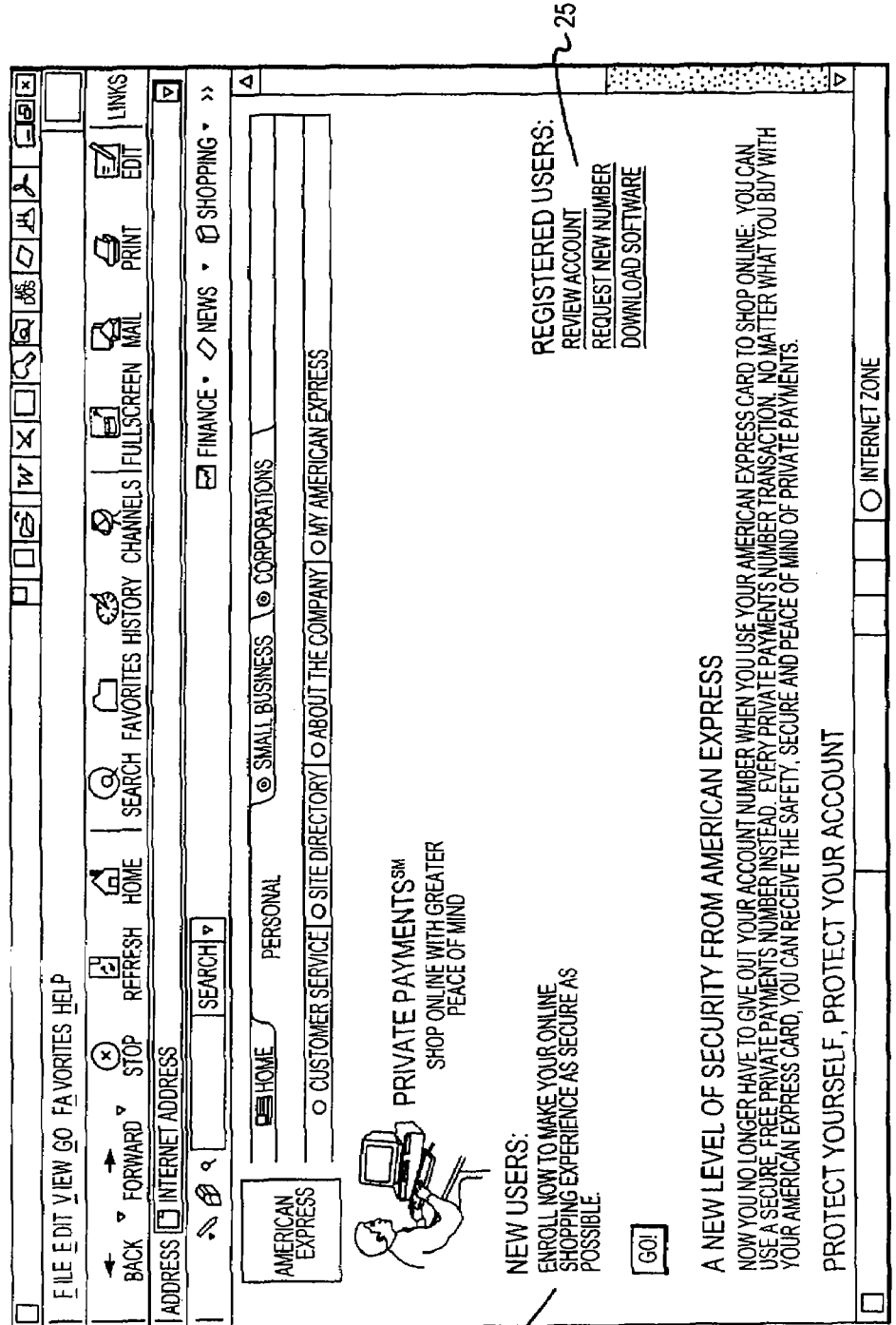
FIG. 3 is a web page screen shot of a issuer's exemplary splash page for a transaction system.
Figure 4:
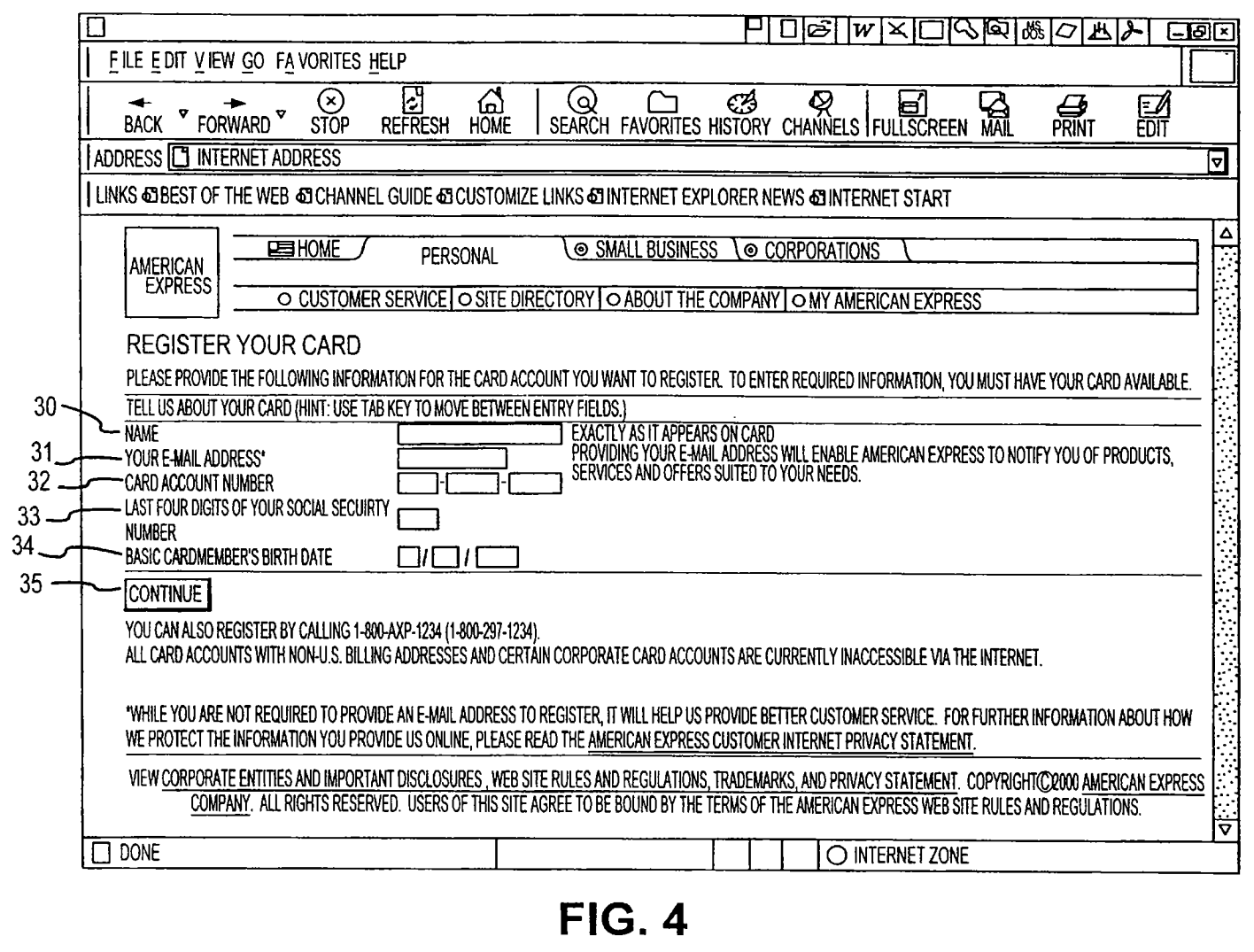

Two exemplary screen shots relating to an exemplary registration process are shown at FIGS. 3 and 4. FIG. 3 depicts a splash page for an American Express® Limited use PIN program. The Limited use PIN program is an exemplary embodiment of the present invention. Here, a new user 23 may enroll to use the program and/or an existing user may access a number of program features 25, e.g., review account, request a new LUP 15 number and/or download software. User 1 generally enters this site by entering an appropriate account provider URL into her browser, by clicking on a link provided by a merchant's website, and/or alternatively, by an automatic pop-up feature that may appear upon recognizing particular URL and/or HTML codes.

To enroll (or register), user 1 is linked to a registration page (FIG. 4) and prompted for information. Information may include the cardholder's name 30, email address 31, card account number 32 (e.g., PCA 20), last four digits of social security number 33, user's date of birth 34, etc. Any suitable authenticating information will suffice. By selecting "continue" 35, user 1 may be provided with a username and password, and/or the cardholder may be allowed to select her own username and password. The user interface system 4 processes this information and suitably interfaces with LUP transaction system 18 (FIG. 8) to register the cardholder. Registration may take many forms and may be accomplished in a variety of ways. For example, issuer 3 may choose to automatically enroll all new charge account applicants and return to the user a username and password with the physical credit card. Although FIGS. 3 and 4 show an online registration process, it should be appreciated that this process may take place via any suitable user interface system.

In one embodiment, during the registration process, user 1 may choose to select and/or define various parameters, conditions, and programs to tailor the transaction system to the user's 1 particular needs. Additional embodiments allow user 1 to select and/or define parameters, conditions and/or programs at any point in the transaction process. In other words, user 1 has the flexibility to select parameters each time (e.g., during registration, log-in, upon LUP request, etc.) LUP 15 is generated and/or may apply universal parameters to every LUP 15 generated. With these selections, for example, user 1 may (i) designate a specific credit card to function as the primary card account; (ii) associate the transaction system with other programs such as a non-currency based membership rewards program, an online digital wallet, an online shopping gateway (e.g., American Express's "ShopAMEX"), an online gift check program (e.g., E-Gift), exemplary buyer's programs, etc.; (iii) provide password protected access to family members; (iv) activate a smartcard feature allowing remote random generation of limited use PINs; (v) designate cell phone, email and/or pager numbers to utilize with the voice and/or automated response limited use PIN generation feature; (vi) and other banking and transaction features that may be apparent to those skilled in the art.

Figure 5:
FIG. 5 is a web page screen shot of a issuer's exemplary online log-in page for a transaction system.

Log-In and Request for LUP 15 (FIG. 2, Step 105):

A registered user 1 generally accesses the account provider's transaction system by logging into the system via any suitable user interface system 4. FIG. 5 depicts an exemplary online log-in screen 130, where user 1 is prompted for authenticating information such as a username 132 and password 134. Alternative systems contemplate authentication via any suitable user interface system. For example, an embodiment employing a portable data device such as an RFID-transponder fob facilitates authentication by waving the fob in front of a transponder reader. After waving the fob, the transaction information may be routed through the user interface system 4 (e.g., web server) to the application server 5, where, as shown in FIG. 5, the application server 5 retrieves information relating to the user's account from the LUP database 6. If user 1 has registered multiple charge accounts, in one embodiment 136, as depicted in FIG. 6, the program prompts user 1 to choose from a list of accounts from a pull-down menu 138. User 1 then selects at least one account to be the primary account and/or to be included in a primary group of accounts (when it is desired for LUP 15 to be associated with more than one account). In other embodiments, user interface system 4 (e.g., web server) will return additional options for user 1, such as prompting user 1 to choose from several condition fields such as those previously mentioned (e.g., restricting use to a particular merchant, amount, allowing use by other recipients, etc.).

Figure 7:
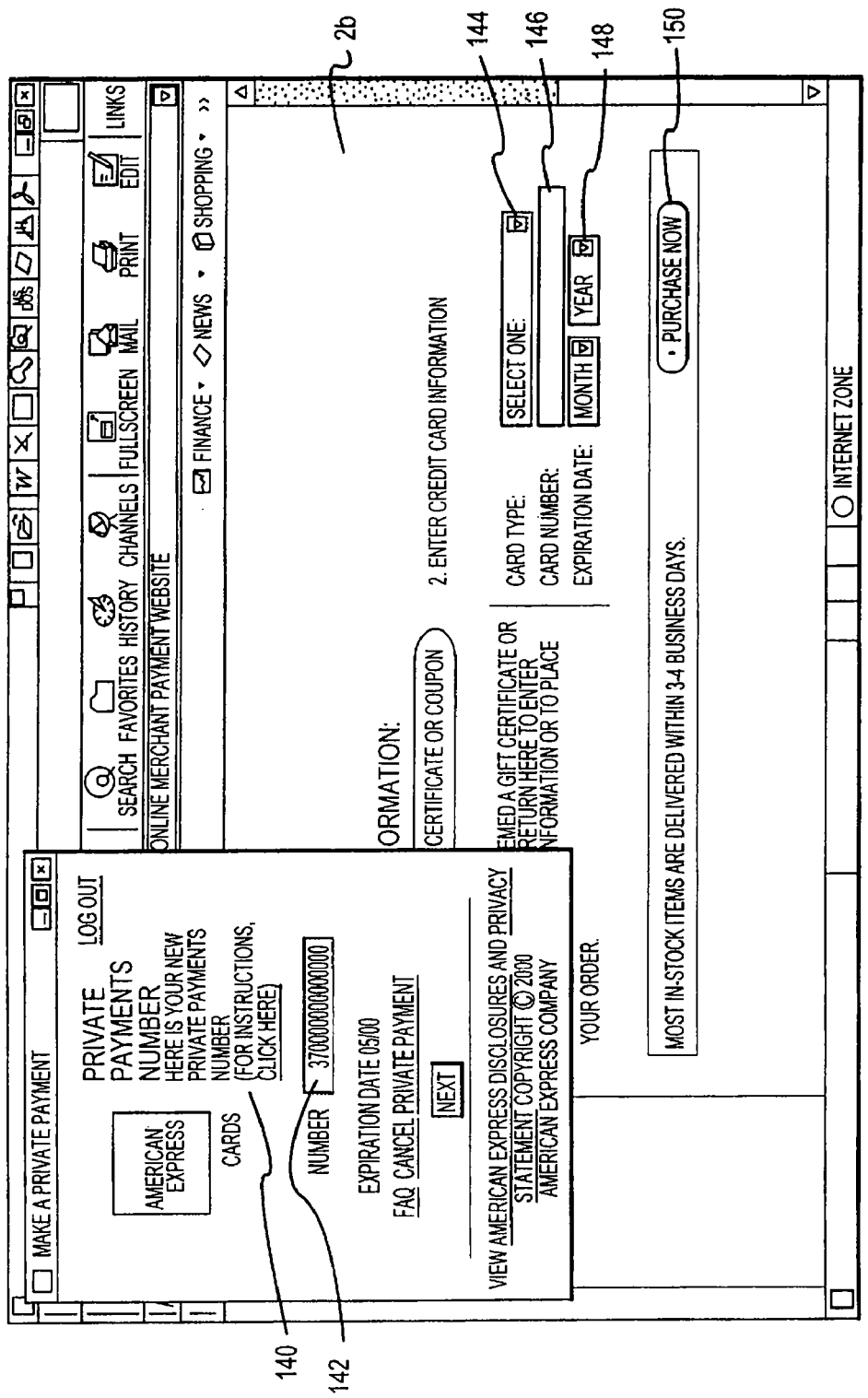
FIG. 7 is a web page screen shot, displaying in the foreground, an exemplary limited use PIN returned to the user; and in the background, a merchant's payment web page.

LUP 15 Generation and Issuance (Distribution) to User 1 (Step 110):

An exemplary online transaction process begins with user 1 desiring to purchase products and/or services from a merchant's website. In this exemplary online system, user 1 selects products from a merchant's online website 2, is routed to and/or clicks to the merchant's payment page 2a (FIGS. 5, 6). User 1 is hyperlinked (manually and/or automatically) to a account provider's web site to log in 130 (FIG. 5), which resides on and is managed by the account provider's user interface system 4 (e.g., web server), and, upon logging in, obtains LUP 15 that may then be "cut and pasted," "dragged and dropped" (or alternatively, automatically filled by issuer 3 and/or downloaded from a digital wallet) into the payment fields 144, 146, 148 (FIG. 7) on the payment web page 2b (FIG. 7). In alternative embodiments, the system includes one and/or more of the following: issuer 3 sends LUP 15 directly to the merchant 2, LUP 15 is encrypted and/or encoded, user 1 enters additional security numbers and/or other indicia and/or a biometric sample is required from the issuer 3. In an exemplary embodiment, LUP 15, as will be discussed next, is generated by the account provider's application server 5 and LUP database 6.

After authenticating user 1 during the log-in process, and receiving a request for LUP 15, the process begins for generating LUP 15. User interface system 4 prompts the initiation of the number generation process in the LUP transaction system 18. In an exemplary random number generation process, LUP 15 is generated (e.g., almost immediately) and provided to user 1 (almost contemporaneous with the user's request). As previously noted, this allows the number to be usable immediately upon receipt by user 1 without the need for separate activation (although separate activation features are contemplated by the present invention), while minimizing any increased risk of theft and/or fraud.

Figure 10:
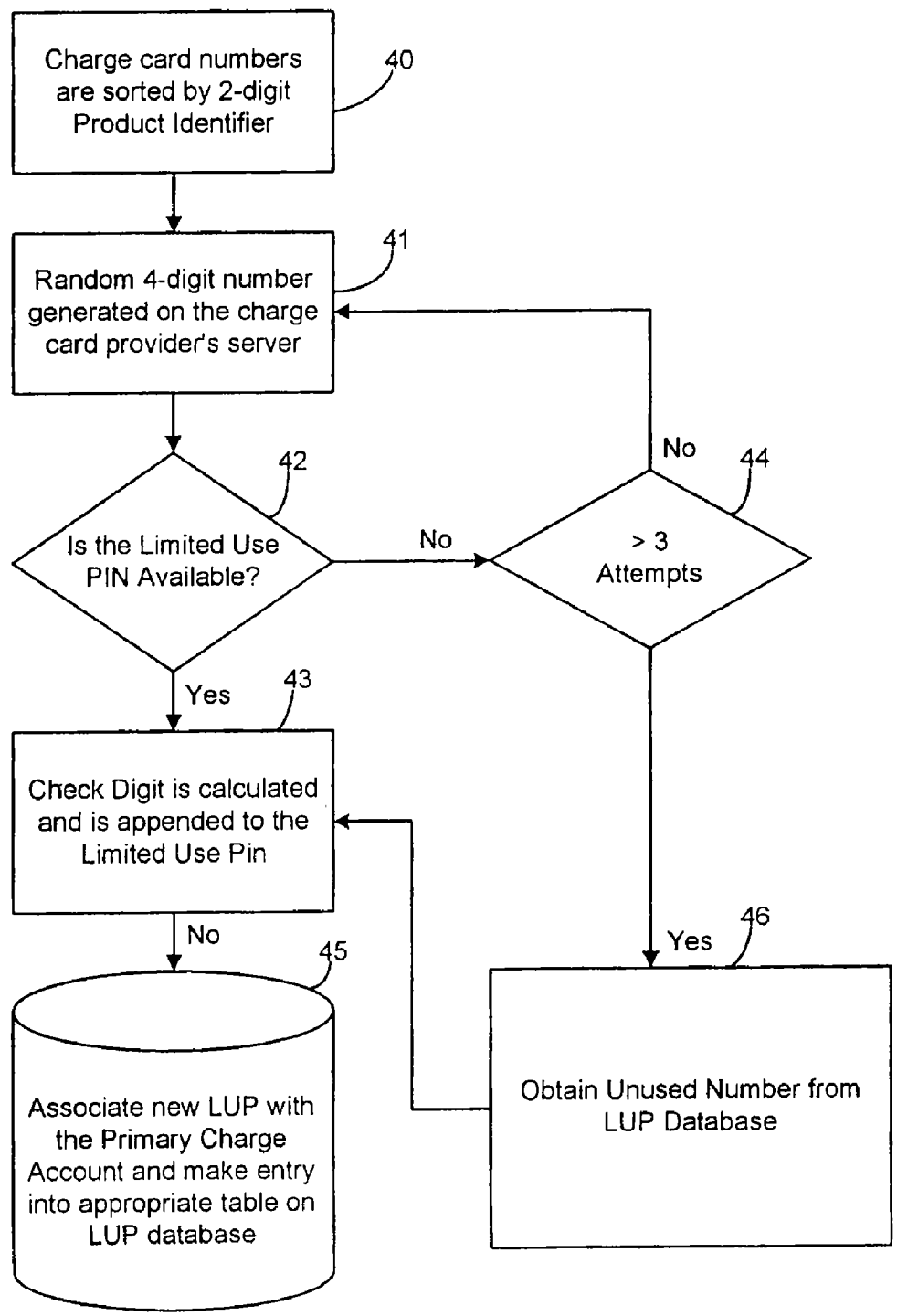
FIG. 10 is a flow chart of an exemplary limited use PIN generation process of the present invention.

An exemplary random number generation process is depicted in FIG. 10. In this exemplary embodiment, each issuer 3 (FIG. 1) is generally identified by a range of numbers on the physical card, typically called the bank identification number (BIN). Each card possesses a product identifier (e.g., first 2 digits of BIN, etc.) that is not part of the random number generation process, but in order to initiate the process, this number must first be selected (step 40). Issuer 3 may set aside a set of product identification numbers relating to limited use PINs for specific use with the transaction system. Alternatively, however, some account providers may find it desirable to use a relationship to the same BIN number designation for both LUPs 15 and regular PINs so that one cannot distinguish between the two types of numbers. As depicted in FIG. 10, a random four-digit number is generated by the account provider's application server 5 using an algorithmic process (step 41). The application server 5 verifies that the randomly generated number is available (i.e., it is not in use nor has it been used by user 1 within a certain period of time) (step 42). If the LUP is free (i.e., not in use), a check digit and the selected product identification number are appended to the number (step 43). This newly created LUP 15 is then associated with the user's PCA 20 and is provided to user 1 (step 45), whereupon LUP database 6 is updated to reflect that this particular LUP 15 is in use and associated with PCA 20 account. If, during step 42, it is determined that the number is in use, the number generation process is repeated up to a preset number of times (e.g., 3) (step 44). After attempting and failing to generate a non-used random number for a preset number of times, a non-used random number is physically selected from LUP database 6 (step 46).

After LUP 15 is generated, conditions of use parameters are applied, and are associated with PCA 20 and/or LUP 15, LUP 15 is then distributed (i.e., issued) to user 1 for use in facilitating a transaction. Communication of LUP 15 may occur via a number of user interface systems 4. For example, FIG. 7 depicts an exemplary online interface where LUP 15 is returned to user 1. This embodiment shows how the account provider window 140 overlays a merchant's online payment page 2b. User 1 selects the appropriate charge account (e.g., American Express®) from the credit type filed 144. User 1 is then able to "cut and paste" and/or "drag and drop" LUP 15 (present in the LUP field 142) into the PIN field 146 on the webpage 2b. Finally, user 1 chooses the appropriate expiration date 148 and completes the transaction by selecting the "purchase now" button 150. Although this embodiment describes linking to a account provider's web site to receive LUP 15, an additional embodiment configures user interface 4 (e.g., web server) and LUP transaction system 18 to seamlessly interact with the merchant's website to eliminate the need to separately link to the issuer 3. In this instance, the generation and issuance of LUP 15 would use merchant 2 as a gateway to issuer 3. Any number of interface systems 4 can be used to facilitate the processes described above (FIG. 2 steps 100, 105, 110).

For example, as just described, distribution of LUP 15 may occur via a "server to desktop" arrangement where a connection is established between the account provider's web-server 4 and the cardholder's 1 desktop computer, using SSL 3.0. With this exemplary system, the number is generated by the application server 5 (according to an algorithmic processing feature) utilizing a random number generation process such as that previously described and delivered to the web server 4. The number is then displayed on the user's 1 desktop. While pre-registration is not required, in an exemplary embodiment, user 1 will have previously registered at the account provider's 3 online web site providing all required personal information, primary charge account numbers, and establishing a user ID and password (if not already established). The user ID and password are then used for verification of user's 1 identity when logging into the account provider's web server 4.

Distribution of LUPs 15 may also occur via a "server to IVR" arrangement, where user 1 calls issuer 3 in order to obtain LUP 15. In this exemplary embodiment, a voice response menu enables user 1 to choose the transaction option, and allows user 1 to enter a main account number. Once identity is verified, a link to the application server 5 is established, prompting generation and delivery of LUP 15 over the phone. In this embodiment, user 1 provides authenticating information by providing date of birth (DOB), a biometric, etc. Once this verification number is matched to customer's records, LUP 15 is distributed. Of course, this process would also work with a live operator arrangement.

Additional distribution embodiments include a number of different delivery vehicles and/or portable data devices, such as use of wireless devices, smart chip encoded devices, personal digital assistants (PDAs), pagers, interactive IVs, etc. For example, a "server to wireless device" is used where a wireless phone with Internet browser is able to access the account provider's transaction site via the account provider's online service web site. LUP 15 can be delivered via text and/or voice. Additionally, with the use of encryption keys, the wireless device can be used as payment vehicles (e.g., LUP 15 is delivered from user 1 to merchant 2 and/or other customer with Blue Tooth and/or other beaming technology). Again, verification of identity can be accomplished by a variety of means, including cardholder ID and password, DOB, PIN number, SIM cards in phones, etc.

Another exemplary embodiment of the transaction system, utilizing one and/or more of the distribution arrangements above, includes situations where a Point-of-Sale terminal (POS) is not present (e.g., submitting LUP 15 to merchant 2 such as, for example, a plumber at home). In this exemplary embodiment, user 1 may not have cash and/or may not want to provide her PCA 20 number and/or PIN to the vendor due to concerns about unauthorized re-use. As such, user 1 calls issuer 3 seeking to obtain LUP 15 with either pre-defined conditions of use and/or cardholder determined conditions of use. A voice recognition system asks for PCA 20 number, the amount she wants to authorize, a merchant ID (e.g., SE number), and/or any other conditions of use. The voice recognition system communicates with the application server 5 and, alternatively CAS 7, to generate LUP 15. LUP 15 is then transmitted to user 1 who in turn provides to the merchant 2. Additionally, merchant 2 can also receive, if desired, an immediate call from the voice response unit to provide an approval code. One skilled in the art will appreciate that this system can be used in association with landline phones, cellular phones, pagers, handheld computers and/or any other PDA devices.

Another exemplary embodiment of the present invention utilizes a smart card system, RFID transponder ("fob") system and/or similar portable data device to generate and/or distribute LUP 15 to the account provider and/or merchant 2. The smart card and/or fob may facilitate the generation of LUP 15 in a number of different ways. In one embodiment, the smart card device itself and/or fob generates LUP 15 from a self-contained processing chip. In another embodiment, the smart card and/or fob interfaces with the account provider's user interface system 4 to cause issuer 3 to generate a number. In another embodiment, the smart card and/or fob supports interaction with a merchant's transaction processing system.

"Smart card" is referred to herein to include any microchip enabled transaction card that is capable of being read by a smart card reader, and is also referred herein to generally refer to any portable data device that is capable of processing information. "Fob" referred to herein to include any contactless device that contains a computer chip and antenna that is capable of being read by a transponder reader.

In an online embodiment, user 1 installs a smart card reader and/or transponder reader and associated software to be used with the user's computer system that is capable of connecting to the Internet. When desiring to make an online purchase, user 1 swipes and/or inserts his smart card through a card reader and/or waves his fob in front of the transponder reader and enters an appropriate PIN. Once properly authenticated, the account provider transaction system generates and issues LUP 15 to user 1. In another embodiment, merchant 2 may have a smart card reader and/or transponder reader capable of interfacing with the user's smart card and/or fob. In this embodiment, user 1 swipes and/or inserts the smart card through the merchant's reader and/or waves his fob in front of merchant's transponder reader, and LUP 15 is displayed to the merchant 2. Additional information relating to smart card and smart card reader payment technology is disclosed in Ser. No. 60/232,040, flied on Sep. 12, 2000, and U.S. Pat. Nos. 5,742,845; 5,898,838 and 5,905,908, owned by Datascape; which are hereby incorporated by reference. Additional information relating to fobs and transponder reader payment technology is disclosed in U.S. patent application Ser. No. 10/340, 352 filed on Jan. 10, 2003, entitled "SYSTEM AND METHOD FOR INCENTING PAYMENT USING RADIO FREQUENCY IDENTIFICATION IN CONTACT AND CONTACTLESS TRANSACTIONS"; U.S. patent application Ser. No. 10/192,488, entitled "SYSTEM AND METHOD FOR PAYMENT USING RADIO FREQUENCY IDENTIFICATION IN CONTACT AND CONTACTLESS TRANSACTIONS," filed on Jul. 9, 2002; U.S. patent application Ser. No. 10/318,432, entitled "SYSTEM AND METHOD FOR SELECTING LOAD OPTIONS FOR USE IN RADIO FREQUENCY IDENTIFICATION IN CONTACT AND CONTACTLESS TRANSACTIONS," filed Dec. 13, 2002; U.S. patent application Ser. No. 10/318,480, entitled "SYSTEM AND METHOD FOR PAYMENT USING RADIO FREQUENCY IDENTIFICATION IN CONTACT AND CONTACTLESS TRANSACTIONS," filed Dec. 13, 2002; and, U.S. Provisional Patent Application No. 60/396,577 filed Jul. 16, 2002. All of the above applications are hereby incorporated by reference.

With an exemplary online fob embodiment, user 1 interfaces with the account provider's user interface system 4 (e.g., website) and registers the fob for use with the transaction system option. User 1 downloads a program and the program is stored on the user's computer. A LUP transaction icon (e.g., Limited use PIN button) appears on the user's browser and/or an icon appears on the display (e.g., Microsoft Windows® system tray). This button, driven by an account provider specific application (activator) that resides on the user's computer, appears each time user 1 launches the browser (or alternatively the button appears at any predetermined intervals, cycles and/or URLs).

User 1 suitably links to an online shopping site, orders a product and/or service and/or fills a shopping cart and goes to the payment page. Fob user 1 clicks the LUP payments button on the browser and/or the icon on the display (or the activator automatically launches the LUP button) and a pop-up window appears, asking user 1 to wave the fob in front of the transponder reader. Alternatively, the transponder reader may be configured to automatically detect the presence of a fob. In another embodiment, any other security data and/or functionality may be included. Upon entering this information, LUP 15 will be generated by the account provider's LUP transaction system 18 (FIG. 8), or, in another embodiment (discussed below) will be generated directly from the fob chip; and a pop-up screen containing LUP 15 number will be displayed on the computer. User 1 then "drags and drops" and/or "cuts and pastes" the randomly generated LUP 15 and other transaction information (e.g., card type, expiration date) into the online order form and completes the transaction. In an alternative embodiment, LUP 15 and other transaction information are automatically filled into the web shopping page by the account provider's web server.

Another exemplary embodiment of the present invention integrates a smart card with an online merchant's website, which may and/or may not be utilized by the user 1. For example, in one aspect of this embodiment the smart card user goes to a merchant website and a "smart card" payments checkout button appears on the payments page. The account provider's transaction system will be invoked if the fob user 1 checks out via the smart card payments button. In an exemplary embodiment, the transaction system option is "behind the scenes." User 1 goes to an online shopping site, orders a product and/or service and/or fills a shopping cart and goes to checkout page. User 1 clicks the fob payments button on the browser and a pop-up window appears, asking user 1 to insert and/or swipe the smart card into the smart card reader. The system may then log user 1 into smart card payments checkout process. User 1 will hit "check out" and the smart card payments checkout process may auto-generate and auto-fill LUP 15 and transaction information into the appropriate payment field (an applet may be read off of the smartcard to transfer number to merchant site.) In this embodiment, LUP 15 will be auto-generated off the smart card chip, where the fob chip may use the Java and/or Multos operating systems and may use a random number generating algorithm. In one embodiment, the smart card chip is able to access the account provider's transaction system or, alternatively, contain a pool of possible numbers (in order to avoid generating the same number twice). The number may also be sent back to the LUP transaction system 18 in order to match the PCA 20 number with LUP 15.

In another embodiment using a smart card, a secure electronic transaction (SET) protocol is used to avoid and/or minimize system/server contact. In this embodiment, PCA 20 number is on the chip but is encoded. The SET protocol may be an encryption algorithm on the chip where part of the initial data would be the user's PCA 20 number. The algorithm could be decoded by issuer 3 but not by merchant 2 to come up with the real account number. In one embodiment, merchant 2 routes the authorization to the account provider via a BIN number rather than PCA 20 number. When the transaction is sent from merchant 2 to issuer 3 for authorization, the CAS 7 triggers the decode algorithm to complete the process, linking LUP 15 to PCA 20 account.

Another embodiment contemplates the use of LUP 15 with a transponder system comprising a first means for generating and/or storing a signal that includes an encoded LUP 15 and a second means for reading and/or receiving the signal. In an exemplary embodiment, user 1 waves a fob in front of the merchant's 2 receiving unit. LUP 15 information can be sent/received by a number of known methods (e.g. optical, magnetic, infrared, radio frequency, etc). Merchant 2 reader captures LUP 15 and forwards LUP 15 (with the associated transaction information) to the account provider's CAS 7 as previously described. The fobs may be set up in a number of ways. Each fob may hold one LUP 15 with certain predefined parameters and/or each transponder device may have several LUPs 15.

LUP 15 Authorization Process (FIG. 2, Step 115):

Referencing FIG. 11, after the limited use PIN (LUP 15) is provided to the merchant 2, merchant 2 submits an authorization request to the issuer 3, as it would with any other credit card transaction. This request is routed to a card authorization system (CAS) 7 for authorization (step 80). The CAS 7 recognizes the transaction as involving LUP 15 and forwards the transaction information to the Authorization Request Listener 77 program on the application server 5 (step 81). The Authorization Request Listener 77 passes the transaction information to a CAS Authentication Component 78 (step 82). The CAS Authentication Component 78 determines if use of LUP 15 has satisfied the previously defined conditions of use parameters. To determine this, the CAS Authentication component 78 looks to LUP database 6 for the conditions-of-use rules and the primary charge account number (PCA 20) that are associated with the particular LUP 15 (step 83). If the use of LUP 15 complies with the rules of use, CAS Authentication component 78 returns an authorization message and the associated PCA 20 to CAS 7 (step 84). CAS 7 then performs an authorization request for the PCA 20, as is typically completed with any physical charge account, to ensure that the primary charge account conditions (e.g., credit limit, expiration date, etc.) have been met.

If CAS 7 authorizes use of PCA 20, the transaction involving LUP 15 is approved and an approval code will be generated. However, PCA 20 must first be replaced with LUP 15 and LUP database 6 must be updated to reflect this transaction data. This is accomplished by CAS 7 returning to CAS Authentication component 78 an approval message with the transaction data (step 85) and CAS Authentication component 78 forwarding to a reversal processing engine 79 (step 86). The reversal processing engine 79 interfaces with LUP database 6 to re-substitute LUP 15 for PCA 20 and also to update LUP database 6 to reflect the transaction information (step 87). For example, if the conditions of use parameters associated with LUP 15 authorized two transactions, this step 87 updates the cardholder account in LUP database 6 to reflect that only one transaction remains. The reversal engine 79 substitutes PCA 20 with LUP 15 and forwards to CAS 7 (step 88). CAS 7 then provides the results to merchant 2 (step 89). If CAS Authentication Component 78 does not authorize use under LUP 15 conditions and/or if CAS 7 does not authorize use under PCA 20 conditions, the transaction will not be approved. When the use conditions of both the primary charge account and the limited use PINs are satisfied, the transaction is approved. In this exemplary embodiment, however, LUP 15 is not deactivated to prevent settlement. To the contrary, settlement may proceed (as discussed next) even when an authorization was declined.

Additionally, use of other third-party networks and systems are contemplated by the present system. One exemplary system allows issuer 3 to associate LUPs to third-party accounts, offering the same fraud reduction benefits to external card issuers. Here, in this exemplary system for authorizing LUPs, merchant 2 submits an authorization request to issuer 3. CAS 7, recognizing LUP 15 forwards the request to application server 5. The conditions of use are checked and the authorization request is modified to substitute LUP 15 with the associated primary charge account (PCA 20). In some cases, a merchant identifier may be included in the authorization request. Therefore, a translation may occur to substitute issuer 3 merchant ID with the corresponding third-party card issuer merchant ID. The request is then returned back to CAS 7 for a normal authorization. CAS 7 then recognizes the account as originating from another issuer (third-party issuer 92), forwards the authorization request to a third-party issuer's network for processing (step 84a). The network 91 routes the request to the appropriate third-party issuer 92 for an authorization determination. The third-party issuer 92 processes the authorization request and returns the result to CAS 7 for forwarding back to application server 5 (step 84b). Application server 5 saves the authorization result (approval and/or denial) and substitutes PCA 20 with LUP 15 and returns to CAS 7 for forwarding to the merchant 2.

The authorization and settlement processes may occur as separate steps and/or as a single step. In one embodiment, referred to herein as an electronic data capture (EDC) system, merchant 2 sends an authorization request and if the authorization request is approved, a receipt of charges is created and submitted for the merchant 2. Separate sequences of file transmissions and/or messages are therefore not required. Various embodiments, hybrids, and modifications of these processes should be apparent to one skilled in this art.

LUP 15 Transaction Settlement (FIG. 2, Step 120):

Prior art systems typically deactivate a temporary PIN during the authorization process if limited-use conditions are not met. As previously explained, because of the uncertainty and variability of the authorization processing, this often results in PINs being unintentionally deactivated, thereby bringing the transaction processing to a sudden halt. An exemplary embodiment of the present invention overcomes this problem by not "deactivating" the limited use PIN when predetermined conditions are not met. But instead, allowing the transaction to proceed through settlement, albeit without a valid approval code, where the merchant bears the risk that the amount will later be charged back by issuer 3 if the transaction is disputed by user 1.

An exemplary settlement process of this invention involves the back end systems shown in FIG. 8. Specifically, referencing FIGS. 1 and 8, the back end process utilizes a financial capture system (FINCAP) 10 to capture the settlement information (e.g., receipt of charges "ROC" and summary of charges "SOC") from the merchant 2, a back end application service 8 to ensure that proper account information is processed, an accounts payable system 9 to pay the merchant 2, and an accounts receivable system 11 to process the account statement that is provided to user 1. An exemplary embodiment of the settlement process involves a settlement request being made by merchant 2 for a transaction involving LUP 15. All settlement requests are forwarded to the account provider's back end system 14 for processing where the request is initially sent to FINCAP 10. FINCAP 10 captures the ROC and SOC data and identifies, via the card product identifier (or by any other suitable means), the transaction as involving LUP 15. In another embodiment, the product identifier (or BIN number) does not differentiate between LUP 15 and a regular PIN. In that instance, it will be necessary for FINCAP 10 to call the back end application service 8 (which interfaces with the LUP database 6) to identify LUP 15 from other PINs. After LUP 15 is distinguished from the ordinary PINs, FINCAP 10 verifies that the number is valid (i.e., exists in the LUP database 6). If LUP 15 is a valid number, FINCAP 10 creates a payment (accounts payable) file including the transaction data and sends a payment message to the AP system 9 instructing merchant 2 to be paid. In paying the merchant 2, issuer 3 references only LUP 15 and does not release PCA 20 and/or any other regular charge account numbers associated with LUP 15.

The back end system 14 processes user 1 LUP account information as follows. After capturing the transaction information (ROC and SOC) from the merchant 2, FINCAP 10 creates a cardholder account (accounts receivable) file and sends a message to the back end application service 8 to process the information for cardholder billing. Recognizing that the transaction involves LUP 15, the back end application service 8 replaces LUP 15 with PCA 20 and/or a primary PIN, updates the cardholder LUP account information in LUP database 6 to reflect the appropriate transaction settlement information, and processes the transaction as with any other transaction. The back end application service 8 sends the transaction details to the AR system 11, where the AR system 11 sends the proper statement to user 1, typically referencing only PCA 20 number. In another embodiment, the AR system 11 may process the statement where the transactions are further categorized and itemized by both PCA 20 number and LUP 15.

As previously noted, it may often be the case with prior art systems, that the limited use PIN is inadvertently deactivated during the authorization phase and completion of the transaction is not possible (e.g., multiple payment purchases). The present transaction system overcomes this problem by ensuring that valid limited use PIN numbers will be processed. If the conditions-of-use parameters are not met, user 1 is, under an exemplary embodiment of the present system, able to dispute the transaction and have the transaction charged back to merchant 2 during the dispute handling process (discussed next). During this dispute handling phase, issuer 3 will retrieve information from LUP database 6 to determine if the disputed information was "authorized" (i.e., has an associated approval code). If the transaction was not "authorized" because the conditions of use parameters were not satisfied, the amount will be charged back to merchant 2 according to predefined business rules.

Another embodiment provides for checking the approval codes and other conditions during settlement. Here, transaction information (approval code, SE number, and/or other information) may be checked during settlement. For example, the back end application service 8 (or the application server 5) may compare transaction information to a business rule and/or conditions set associated with user 1 LUP account. If conditions of use have not been met and/or if a valid approval code is missing, the service 8 and/or server 5 may cause a charge back to be issued to the merchant to offset the previous merchant payment. In other words, in this alternative embodiment, where an LUP 15 transaction is processed through settlement, the following events may occur in sequence. First, a payment file is established once it is determined that LUP 15 is a valid number. Second, the merchant is paid. Third, the system applies the business rules and/or conditions for the particular account associated with LUP 15. Fourth, if it is determined that merchant 2 should not have been paid in the first instance because the transaction conditions were not met and/or an approval code was not present, the system will execute a charge back to the merchant 2. This settlement processing may be transparent to user 1 since, before the AR system releases a cardholder billing statement, the merchant is paid and then charged-back resulting in no outstanding balance to user 1.

As shown in FIG. 8, the present invention contemplates the interaction of clearing and settlement systems other than those of the issuer 3. This exemplary system allows a issuer 3 to clear and settle LUP transactions where LUP 15 is associated to a third-party account, meaning merchant 2 is paid and the charge is billed to user 1. As such, an exemplary embodiment of the present invention is configured to support interaction with third-party networks and systems. Here, the back end application service 8, upon receiving LUP 15, recognizes that the associated PCA 20 originated with another card issuer 92. The back end service 8 separates the transaction into two transactions (a clearing transaction and a settlement transaction). A substitution occurs in the clearing transaction where LUP 15 is replaced by the associated PCA 20. Also, a translation may occur to substitute issuer 3 merchant ID with the corresponding third-party card issuer ID. The transactions are then forwarded to a third-party clearing and settlement network 93. The third-party clearing and settlement network 93 handles the routing, as appropriate, to a merchant acquirer's accounts payable system 91 and an issuer's accounts receivable system 92. As noted above, the accounts payable system ensures that all correspondence with merchant 2 references LUP 15.

Dispute Handling and Customer Service Process (Step 125):

The dispute handling process of the present invention involves situations where user 1 and/or merchant 2 a disputes charge that is associated with a transaction involving LUP 15. Generally, user 1 disputes a charge by contacting the charge issuer 3 via phone, mail, and/or Internet. As previously noted, an exemplary AR system 11 typically bills user 1 with reference to only PCA 20 number. The computer systems of the present invention allow the account provider's customer service representatives to lookup information based on, inter alia, LUP 15 and/or PCA 20 number. FIG. 12 depicts an exemplary look-up screen 175 for reviewing the primary charge account 20 and the transactions associated with LUPs 15.

With respect to a cardholder initiated dispute, the representative initiates a dispute through a dispute handling system (DHS) to obtain the case avoidance and/or case set rules for cardholder disputed transactions. One of the case avoidance and/or case set rules provides for a look up from LUP database 6 to verify that the transaction was processed with an approval code. The rule set may provide for, inter alia, an automatic charge back of the transaction amount to the merchant if an LUP 15 transaction is submitted without an approval code. The DHS and/or the representative initiates user 1 and/or merchant 2 contact (via phone, mail, Internet). Disputes involving LUPs 15 may be automatically routed to predefined LUP queues based on industry type (i.e., airline, car rental, etc.). Contact letters may be automatically filled with information retrieved from LUP database 6. The adjustment file accesses the application server 5 (or back end application service 8) to substitute PCA 20 number with LUP 15. A letter file is then generated and an electronic transmission system routes electronic contacts to and from various merchant interfaces.

In an exemplary system for handling disputes from merchant 2, merchant 2 contacts issuer 3 via normal channels. The account provider's representative generally accesses a customer service application that is used to service merchants. This customer service application identifies the account by LUP 15 in dispute. A case is set-up with LUP 15 and is managed via adjustment management systems. The adjustment management system and a letter generating system access LUP transaction system 18 for the account number swap, where the PCA 20 number is replaced with LUP 15 for financial adjustments intended for user 1. The remaining inquiry is processed as with existing dispute handling systems.

Although the previously described embodiments generally relate to a user's 1 request for LUP 15, merchant 2 may also find it desirable to request limited use PINs from issuer 3 in order to limit exposure to card fraud. In traditional transaction processes, upon completing a transaction, merchant 2 stores transaction information (including the customer's credit card number) in a merchant database. This database of information is subject to card fraud in that a thief could hack into the merchant's computers to steal its customer's PINs and/or account numbers. To limit exposure, merchant 2 may desire to replace those customer PINs with LUPs 15 that are associated with the user's primary charge account (e.g., PCA 20) (i.e., the merchant may not want its database filled with actual customer credit card numbers and/or PINs). In this situation, only issuer 3 maintains the actual credit card number and/or PIN and merchant 2 retains only the LUP 15. In an exemplary process, the merchant receives a regular PIN from user 1 to facilitate a transaction. Merchant 2 submits the number to issuer 3 for authorization, requesting that issuer 3 instead of returning the regular PIN, return LUP 15 (and approval code) that is associated with the regular PIN. In response, the account provider generates LUP 15, associates the number to the regular PIN (which is associated with the primary account (e.g., PCA 20)), checks to see if authorization is appropriate and returns the authorization record (only referencing LUP 15) to the merchant 2. Merchant 2 processes the transaction through the normal settlement channels, referencing LUP 15 instead of the regular PIN. When retaining transaction records, merchant 2 replaces the primary PIN with LUP 15 and maintains LUP 15 in its database.

In another embodiment, merchant 2 accepts only LUPs 15—not regular PINs—from users to complete transactions. For the same reasons stated above, merchant 2 may desire to limit receipt of regular PINs to limit exposure to card fraud. In one exemplary embodiment, merchant 2 computer system differentiates between LUPs and regular PINs and will not allow customers to use regular PINS to facilitate a transaction (i.e., will refuse the transaction). As previously described, however, LUP 15 and the regular PIN may be transparent to merchant 2 making it difficult for merchant 2 to differentiate between LUP 15 and the regular PIN. In this situation, in an exemplary embodiment, LUP 15 will be identified during the authorization process by the issuer 3, where if LUP 15 does not meet certain conditions defined by the merchant 2, the transaction will not be authorized. For example, the merchant could require that all customer transactions be completed with LUP 15 that has limited-use conditions restricting use to the amount of the transaction and/or restricting use to the particular merchant. During the authorization process, LUP 15 is compared with the merchant-defined conditions where if the conditions are not satisfied, the authorization request will be denied. After completion of the transaction, and upon satisfying merchant 2 conditions, the LUPs 15 have little to no value and would be of minimal value to a potential thief.

Several Additional Embodiments of the Transaction System are Provided Below.

In one embodiment, LUP database 6 is used to facilitate the merging of a newly acquired cardholder base with an established cardholder base. For example, when a bank and/or other institution sells a cardholder base to issuer 3, issuer 3 creates new physical accounts for the acquired cardholders and does not issue new cards. LUP database 6 is updated to associate the acquired cardholder account numbers to the newly created accounts. This allows the cardholders' existing physical cards to still be used and processed appropriately. The account provider (BIN) routing is modified for the acquired accounts so authorization requests and settlements are sent to issuer 3 instead of to the bank and/or other institution. CAS 7 and FINCAP 10 recognize these acquired accounts as LUP 15 accounts and translate the numbers appropriately. The end result is that charges made by the acquired cardholders end up on a statement generated by the issuer 3.

In another exemplary embodiment of the transaction system, issuer 3 may provide a line of credit to a customer and/or to merchant 2 and/or group of merchants who can private label for use by their customers. This allows merchant 2 to provide a branded line of credit with minimal and/or no changes to the credit card authorization and settlement process. In one embodiment, merchant 2 approves a line of credit and/or asks issuer 3 to approve a line of credit for the customer. By the phrase "line of credit," merchant 2 may allow user 1 to overdraw on a credit limit, extend a credit limit, make an emergency ATM withdraw, and/or provide user 1 with any other type of line of credit.

The account provider would then issue LUP 15 to the customer via the merchant 2. This LUP 15 is generally used with the merchants 2 who are issuing the line of credit. When the customer wants to make a purchase using the merchant's line of credit, the merchant forwards a standard credit request to issuer 3 with LUP 15 used as the credit card number in the transaction protocol. Issuer 3 verifies that the line of credit is authorized and was submitted by merchant 2 issuing the line of credit associated with this LUP 15. The account provider transaction system (via LUP transaction system 18) is capable of denying usage of this line of credit at another non-participating site. Issuer 3 may provide a private label and/or co-branded web, site to apply for the line of credit. The account provider's back end system 14 then bills the customer and pays the merchant. Merchant 2 may keep the electronic line of credit privately at their site, and/or provide it to the customer. The authorization system would not authorize usage at other sites.

Figure 13:
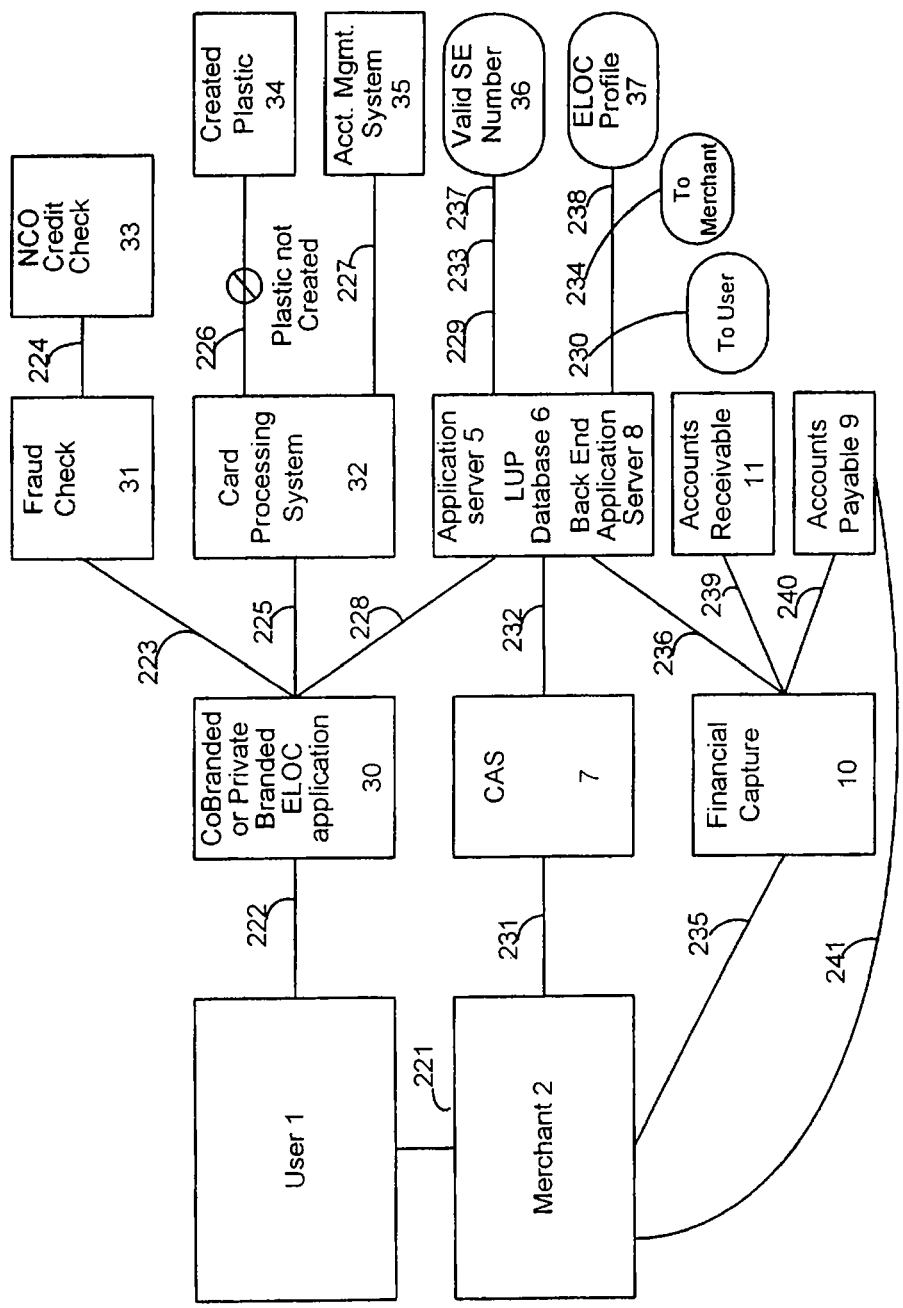
FIG. 13 is a flow diagram depicting an exemplary embodiment of the present invention involving an electronic line of credit system.

FIG. 13 depicts an exemplary transaction process for use in providing lines of credit to merchants 2. User 1 and/or customer (who may and/or may not be an existing card member of the participating issuer 3 applies for an electronic line of credit (ELOC) with merchant 2 (step 221), merchant 2 redirects user 1 to the account provider's 3 website to fill out the ELOC application 30 (step 222). A fraud check 31 is performed (step 223) and a credit inquiry is typically performed by any credit bureau company 33 (step 224). If an account processing system 32 determines that credit is acceptable, an account is set up (step 225). A physical card 34 is not generated as with typical processes and may need to be purged depending on the particular system set-up (step 226). The account is sent to the account management system 35 (step 227) and then forwarded to LUP database 6 and the application server 5 (step 228). User 1 account is then related to a valid merchant identification number such as the SE number 36 (step 229). An account is then set-up with an ELOC profile 37 and at this point the limited use PIN ELOC number is passed back to user 1 (step 230). Merchant 2 submits the ELOC payment request to CAS 7 (step 231), and CAS 7 routes the ELOC to the LUP system (step 232), where the LUP system verifies that the SE number is approved for this particular ELOC (step 233). The LUP system translates the ELOC LUP to the related account in the account management system and returns the ELOC LUP to merchant (step 234). The merchant is then required to submit the authorization code with the receipt of charges (ROC) and summary of charges (SOC). The merchant submits the ROC and/or SOC to the account provider's FINCAP 10 (step 235), whereupon FINCAP forwards the ELOC to the LUP system (step 236). The LUP system verifies that (i) this SE number is valid for the particular ELOC account (step 237) and (ii) the particular transaction was authorized for the specific ELOC account (step 238). The LUP system then flips the account/card number, returns it to FINCAP 10, whereupon, the number is forwarded to the account provider's accounts receivable system 11 (step 239). FINCAP forwards the ELOC LUP and associated information to the Accounts Payable system 9 (step 240) and pays merchant 2 (step 241).

Another exemplary embodiment allows a user to fund an online digital wallet with the limited use PIN. In this embodiment, after generation and association with the primary charge account, the limited use PIN is provided to the user to use within a designated digital wallet, which may reside locally at the user's computer and/or may be stored in an online password protected account.

In yet another alternative embodiment, the limited use PIN system may be used to facilitate programs involving non-currency tender, such as the American Express® Membership Rewards as Currency™ system that is detailed in U.S. Provisional Application No. 60/200,492, filed Apr. 28, 2000, and U.S. Provisional Application No. 60/201,114, filed May 2, 2000, which are hereby incorporated by reference. One embodiment of this system, depicted in FIG. 14, allows user 1 to create LUP 15 to be used to spend membership rewards points. In general, a membership and/or incentive rewards program is a loyalty program that rewards cardholders for using their charge card to make purchases. Cardholders accumulate points by using a participating charge card and/or by purchasing products at a participating merchant. These points may then be converted to a monetary value and redeemed to purchase merchandise.

Figure 14:
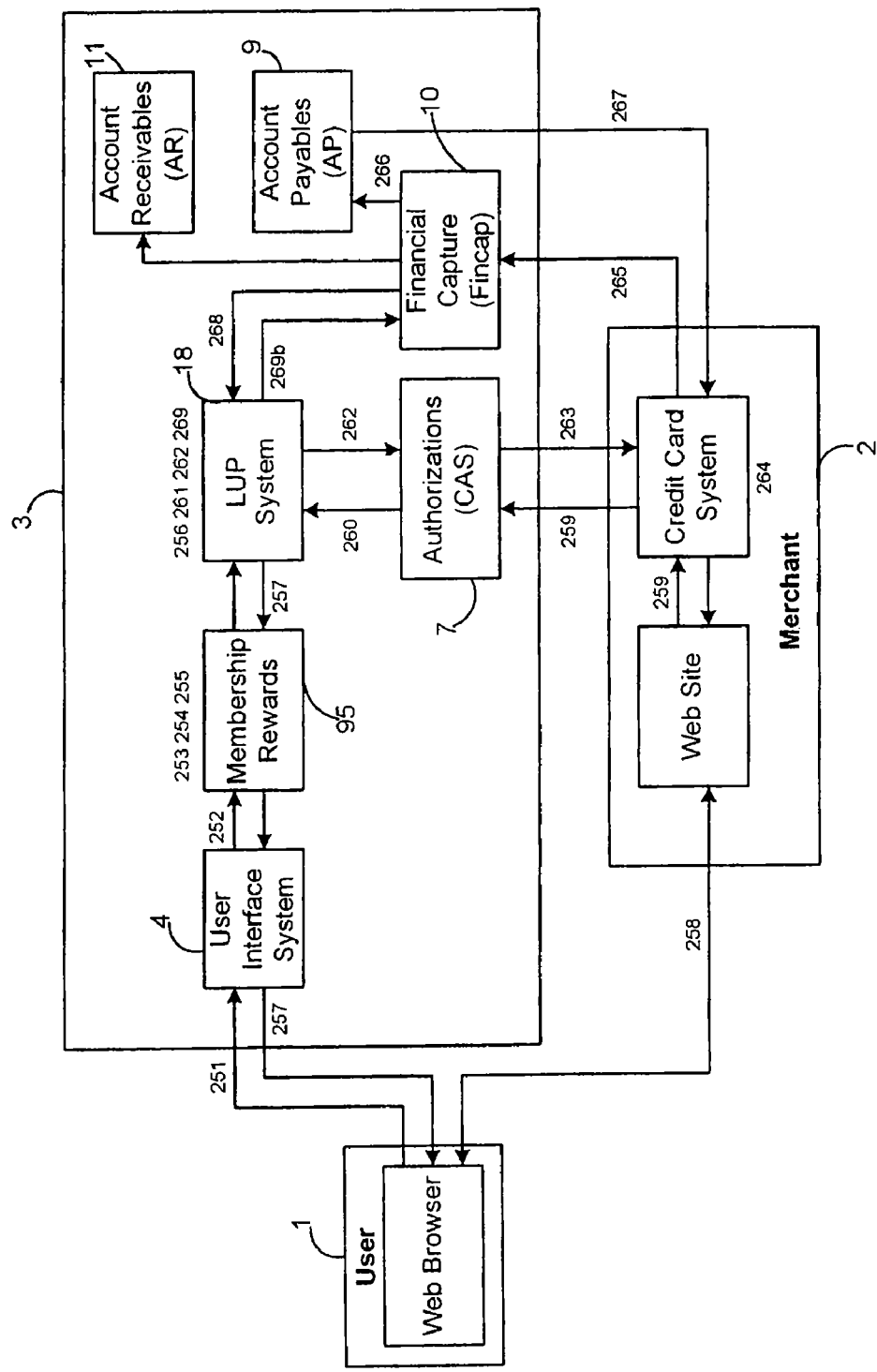
FIG. 14 is a flow diagram depicting one embodiment of an exemplary transaction system of the present invention used to facilitate a non-currency based membership rewards program.

As depicted in FIG. 14, user 1 accesses and logs onto the account provider's services via a user interface system 4 (e.g., an Internet connection) (step 251). User 1 proceeds (clicks on hyperlink) to the membership rewards (MR) system 95, where she indicates that she would like to use her membership reward points that are available in her MR account (step 252). MR system 95 reports to user 1 how much the available MR points are worth (step 253). User 1 indicates how many of the MR points (converted to monetary value) should be loaded info an account that can be used for purchases (step 254). In an exemplary embodiment, LUP 15 can be associated with a MR account (i.e., a PIN associated with a primary charge account) that is funded with these MR points. Use of this MR account may be limited by user 1 and/or issuer 3, and/or could be further limited by the MR system rules of use that may have been predefined by participating merchants (step 255). Once the MR system 95 has approved the request and allocated the requested MR points, LUP system 18 associates LUP 15 and establishes an MR-LUP profile (256). The MR-LUP profile contains the options that will be applied and the amount that will be available to the resulting LUP 15. LUP system 18 returns LUP 15 (and other account information) to the MR system 95 to provide to user 1 for use in completing subsequent transactions (e.g., online purchases) (step 257).

When desiring to purchase products using the MR point-funded LUP 15, user 1 proceeds to a merchant site (e.g., online website), selects goods and is requested by the merchant to provide payment information (e.g., via an online payment web page). User 1 chooses the appropriate issuer 3 as the form of payment (e.g., American Express®, Visa®, etc.) and enters LUP 15 (and other needed information) into the appropriate payment fields (step 258). The merchant 2 processes LUP 15 authorization as discussed above (step 259), where the account provider CAS 7 recognizes the transaction as involving LUP 15, and forwards the request to the LUP system 18 containing, inter alia, an application server (FIG. 8, number 5) and a LUP database (FIG. 8, number 6). It should be appreciated that profile information may be stored in an MR database, LUP database 6 and/or any other suitable database (step 260). LUP system 18 recognizes the account as an MR account, and verifies that optional conditions, if any, are met. If the conditions are not met, an error is returned to CAS 7 and then to the merchant (step 261). If the conditions are met, the balance available on the MR-LUP profile is reduced by the purchase amount, a record of the purchase is recorded in the MR-LUP profile, and an approval code is returned to the authorization system (step 262) and then to the merchant (step 263). Although additional CAS 7 processing is contemplated by this embodiment, application of additional rules and validations—which would typically be applied—are not required for this type of account. The approved purchase is finalized by the merchant with LUP 15 transaction being submitted through the merchant's existing POS network for settlement (step 264). LUP 15 transaction is received by the account provider's financial capture system (FINCAP) 10 (step 265). The FINCAP 10 forwards the LUP transaction to the appropriate AP system 9 (step 266). The AP system 9 then pays the merchant according to the appropriate settlement terms and conditions (step 267). FINCAP 10, having identified the transaction as involving LUP 15, sends the transaction information to LUP system 18 (via a back end application service 8) to identify the actual account number (i.e. PCA 20) (step 268). LUP system 18 recognizes that LUP 15 is associated with a MR account, searches for the MR-LUP profile and passes a credit request to the appropriate user 1 MR account to reduce the available MR points (step 269), and (ii) the transaction record is used to build a credit against the actual charge account (e.g., PCA 20) that will offset the charged LUP 15 transaction (step 269b). In the first instance (step 269), LUP system 18 passes a request to the MR system 95 to deduct the appropriate number of MR points. In the second instance (step 269b), both the original transaction and the credit are passed back to FINCAP 10 with the actual charge account number (e.g., PCA 20 number). The FINCAP 10 then forwards the charge and credit transactions to the appropriate AR system 11 for normal billing processing.

As shown, the embodiment depicted in FIG. 14 allows user 1 to spend the MR points in at least two ways. First, the membership reward points can be deducted at the time of the transaction processing, and/or second, the transaction can be reflected on the user's bill along with an associated credit that reflects the payment with reward points. It should also be appreciated that user 1 may choose to use MR points on a transaction by transaction basis and may be able to combine variations of currency (e.g., credit, debit cards etc.) and non-currency tender (MR points), as desired, to effectuate a transaction. Additionally, both currency and non-currency tender may be integrated into a LUP gift, where a first party gifts to a second party a limited use PIN that has some currency and/or non-currency value.

Figure 15:
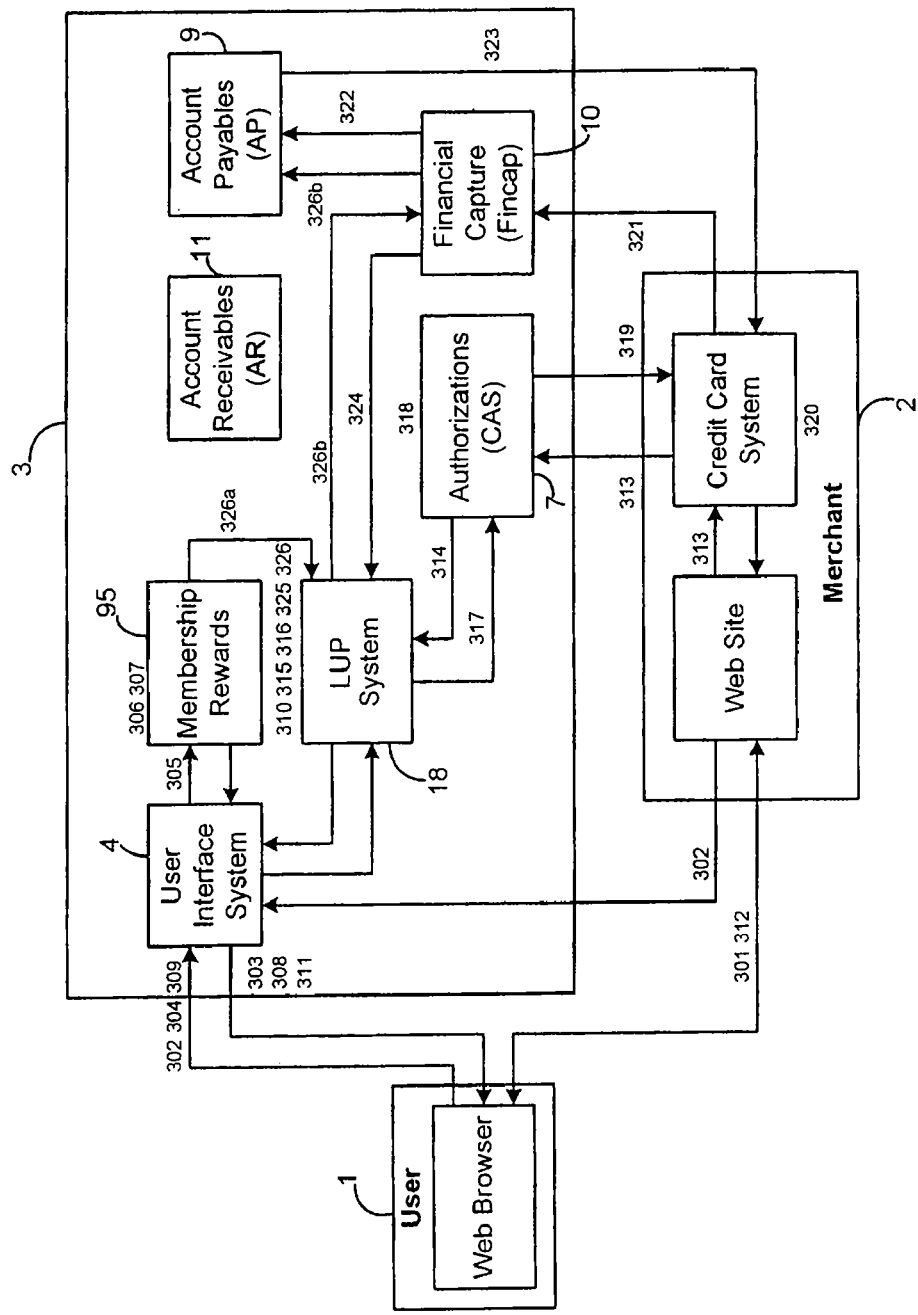
FIG. 15 is a flow diagram depicting a second embodiment of an exemplary transaction system of the present invention used to facilitate a membership rewards program.

Another membership rewards embodiment is shown in FIG. 15. Here, user 1 is able to choose to use membership reward points when shopping at merchant 2 site that supports the membership rewards as a payment option. Referencing FIG. 15, user 1 goes to a participating merchant's site (e.g., online website) to shop for goods and/or services. User 1 selects merchandise and continues to a payment site, where the account provider's MR points is one of the payment options (step 301). When the cardholder selects this option, a secure connection is established with issuer 3 that authenticates both user 1 and merchant 2 (step 302). Issuer 3 requests the user's user ID and Password, either through a pop up screen, a http redirect link, and/or an applet downloaded by the merchant (step 303). User 1 supplies the User ID and Password which is returned to the account provider with the purchase amount (step 304). The account provider user interface 4 (e.g., online services) causes user 1 to be authenticated, collects the associated registered charge accounts and invokes the MR system 95 (step 305). The MR system 95 uses these card accounts to identify the user's MR account (step 306). If none of the registered accounts are related to a MR account, user 1 is not able to use MR points to pay for her purchase and an error is returned to user 1. After identifying the MR account, the MR points available are converted to the corresponding cash equivalent and compared to the purchase amount being requested. If the purchase amount is greater than the MR cash equivalent, an error is returned to user 1 (step 307). If the MR cash equivalent is greater than the purchase amount, all card accounts participating in the MR account are collected and returned to user 1 (step 308). User 1 designates the card account to be used to house all succeeding financial activity, which is then returned to issuer 3 (step 309). Issuer 3 then triggers LUP system 18 to establish LUP 15 that is associated to the selected MR account number and a MR-LUP account profile is set-up (step 310). LUP system 18 returns LUP 15 to the user interface system 4 and then onto user 1 (step 311). User 1 cuts and pastes, drags and drops, and/or auto-fills LUP 15 (and needed information) into the appropriate merchant payment field (step 312).

As previously noted, the merchant uses the existing authorization network to request authorization for the SIP transaction (step 313). CAS 7 recognizes the transaction as one involving LUP 15 and forwards to LUP system 18 (step 314). The LUP system 18 identifies the associated actual account number (e.g., PCA 20 number) and/or PIN for LUP 15 (step 315) and also recognizes the account as an MR account. At this point, although all MR transactions would have been previously verified, the MR account balance is again checked to minimize possible fraud (e.g., fraud involving two requests using the same MR points). The cash equivalent for the MR points for the actual account are then retrieved from the MR system 95 and if the purchase amount is greater than the available amount, a denial is returned to the authorization system and to merchant 2 (step 316). If the cash equivalent value of the MR points exceeds the purchase amount, the LUP system records the purchase in the MR-LUP profile and returns LUP 15 to CAS 7 (step 317). CAS 7 then completes the authorization for the actual account (e.g., ensuring that the limits for PCA 20 are complied with) (step 318), and returns the results (e.g., approval code) to merchant 2 (step 319).

The approved transaction is finalized by merchant 2 with the LUP transaction being submitted through the existing point-of-sale network for settlement (step 320). As before, the transaction information is received by the account provider FINCAP 10 (step 321) and then forwarded to the appropriate AP system 9 (step 322) for payment (step 323). Since the transaction involves LUP 15, FINCAP 10 directs the transaction to LUP system 18 to identify PCA 20 and/or the regular PIN (step 324). LUP system 18 identifies the PCA 20 and/or the regular PIN (step 325) and also recognizes LUP 15 account is set up using MR points, where LUP system 18 searches the MR-LUP profile for the associated purchase record (step 326). LUP system 18 either (i) passes a credit request to MR to reduce the MR points (step 326*a*), and/or (ii) creates a credit against the billing transaction (step 326*b*). In step 326*a*, LUP system 18 passes a request to MR system 95 to deduct the appropriate number of MR points. Here it is not necessary to return the AR transaction information to FINCAP 10 for forwarding to AR system 11, but a reconciliation entry is created to reconcile AR 11 for FINCAP 10. In step 326*b*, a transaction record is used to build a credit against a real account number (e.g., PCA 20) that will offset the charge transaction. LUP system 18 forwards this credit to the FINCAP 10. The original billing transaction is returned to the FINCAP 10 to appear on user's 1 statement. FINCAP 10 then forwards the charge transaction to the appropriate AR system for normal processing. FINCAP 10 forwards the credit issued by the MR system 95 to the appropriate AR system 11 for normal billing processing. Accordingly, user 1 will see on her statement a credit reflecting the currency value of the MR points used and a charge in the amount of the transaction.

Another embodiment provides for the generation of one and/or more LUPs that are subordinate to and associated with a main limited use PIN that, as described above, is associated with the user's PCA 20 account. As noted above, these subordinate numbers may also be digitally stored in devices such as wireless telephones, PDAs, handheld computers, and the like. Providing multiple layers of limited use PINs provides user 1 with greater flexibility. For example, a cardholder on vacation could structure the main LUP 15 to be valid for the duration of the vacation. User 1 is then able to generate subordinate limited use PINs (or tertiary numbers) with varying conditions to take into account various activities that may occur during the vacation. User 1 could structure the main limited use PIN to have a maximum credit limit of $3,000 (this assumes that the associated primary charge card credit limit is equal to and/or greater than $3,000) that is good for the duration of the vacation. A subordinate limited use PIN may then be provided to the spouse with a $1,000 limit and additional limited use PINs, restricted to $500 limits, could be provided to the children. Each subordinate card would be valid only for the duration of the vacation and would only be valid for the maximum dollar amount specified. As another example, LUP 15 may be valid for a specific merchant and/or a specific subset of merchants. That is, a user may only be allowed to use LUP 15 for a transaction at Macy's or for a transaction at any grocery store.

Similarly, another embodiment provides for the generation of one and/or more special purpose LUPs. As used herein, "special purpose" may refer to one discreet purpose, a number of related purposes, and/or multiple purposes. As noted above, these special purpose LUPs may also be digitally stored in devices such as wireless telephones, PDAs, handheld computers, and the like. Providing one or more special purpose LUPs provides user 1 with greater flexibility. For example, a special purpose LUP may be used for a child who wants to borrow, for example, a credit card, for an event. The special purpose LUP may be associated with a credit line of PCA 20, such as, for example $500. Once the child exceeds the credit line, the LUP may be configured to no longer function and/or provide authorization and/or access to PCA 20.

Another example of a special purpose LUP is a LUP that may be configured to facilitate one or more responses. For example, a special purpose LUP may be configured to be associated with an emergency response. That is, if the special purpose LUP is entered into a website, POS, ATM and/or other similar hardware, the special purpose LUP may automatically trigger an emergency response, such as, for example, notification of the police or fire department. As another example, the special purpose LUP may be configured with a notification response. For example, the special purpose LUP may be configured to automatically send notification to a parent and/or an employer and/or other person any time the special purpose LUP is used.

Benefits, other advantages, and solutions to problems have been described above with regard to specific embodiments. However, the benefits, advantages, solutions to problems, and any element(s) that may cause any benefit, advantage, and/or solution to occur and/or become more pronounced are not to be construed as critical, required, and/or essential features and/or elements of any and/or all the claims. As used herein, the terms "comprises," "comprising," and/or any other variation thereof, are intended to cover a non-exclusive inclusion, such that a process, method, article, and/or apparatus that comprises a list of elements does not include only those elements but may include other elements not expressly listed and/or inherent to such process, method, article, and/or apparatus. Further, no element described herein is required for the practice of the invention unless expressly described as "essential" and/or "critical."

I claim:

1. A host computer system for facilitating transactions comprising: a user interface system configured to allow a first party to interact with the host computer system; and, a number generating mechanism, including an application server and a database, configured for receiving input from the user interface system, receiving a limited use Personal Identification Number (PIN) for the first party for use with a second party, wherein the limited use PIN is generated by at least one of: an RFID device and a smartcard, associating a designated primary account with the limited use PIN, associating the limited use PIN with a notification response, wherein the notification response is associated with a notification response rule relating to who to notify if the limited use PIN is used, associating the limited use PIN with an emergency response, wherein the emergency response is associated with an emergency response rule relating to an emergency entity to notify if the limited use PIN is used, and issuing the limited use PIN to the first party to facilitate a transaction with a second party, wherein the limited use PIN is configured to be immediately usable for facilitating the transaction with the second party;

a number processing mechanism, including an application server and a database, configured to:

receive transaction information from the second party for authorization, wherein the transaction information includes the limited use PIN;

forward the transaction information to a card authorization system for authorization processing;

process the transaction information with the card authorization system, wherein the card authorization system determines whether the transaction information includes the limited use PIN and interfaces with a limited use PIN system to determine whether authorization is appropriate, wherein authorization determination includes:

receiving account information associated with the account number; and determining whether conditions-of-use parameters associated with the limited use PIN are satisfied, the conditions-of-use parameters defining at least a predetermined restriction on use of the limited use PIN;

acquiring, from a database, the notification response rule corresponding to the limited use PIN;

issuing said the notification response in accordance with said notification response rule;

acquiring, from the database, the emergency response rule corresponding to the limited use PIN;

issuing the emergency response in accordance with the emergency response rule; and return an appropriate approval code to the second party, if conditions of use parameters associated with the limited use PIN and the primary account are satisfied; and decline the authorization request if either the conditions associated with at least one of the primary account and the limited use PIN are not satisfied.

2. The host computer system of claim 1, further comprising a settlement processing mechanism including at least a financial capture system configured for capturing transaction information relating to use of the limited use PIN, an accounts receivable system for billing the first party and an accounts payable system for paying the second party.

3. A host system for facilitating transactions, said host system configured to:

identify a primary account;

receive a limited use Personal Identification Number (PIN) that is configured to facilitate a transaction, wherein the limited use PIN is generated by at least one of: an RFID device and a smartcard;

associate the limited use PIN with the primary account;

associate the limited use PIN with a notification response, wherein the notification response is associated with an notification response rule relating to who to notify if the limited use PIN is used;

associate the limited use PIN with an emergency response, wherein the emergency response is associated with an emergency response rule relating to an emergency entity to notify if the limited use PIN is used;

issue the limited use PIN to a first party to facilitate a transaction with a second party;

receive transaction information from the second party for authorization, wherein the transaction information includes the limited use PIN;

forward the transaction information to a card authorization system for authorization processing;

process the transaction information with the card authorization system, wherein the card authorization system determines whether the transaction information includes the limited use PIN and interfaces with a limited use PIN system to determine whether authorization is appropriate, wherein authorization determination includes:

receiving account information associated with the account number;

determining whether conditions-of-use parameters associated with the limited use PIN are satisfied, the conditions-of-use parameters defining at least a predetermined restriction on use of the limited use PIN;

acquiring, from a database, the notification response rule corresponding to the limited use PIN;

issuing said the notification response in accordance with said notification response rule;

acquiring, from the database, the emergency response rule corresponding to the limited use PIN;

issuing the emergency response in accordance with the emergency response rule; and return an appropriate approval code to the second party, if conditions of use parameters associated with the limited use PIN and the primary account are satisfied; and decline the authorization request if either the conditions associated with at least one of the primary account and the limited use PIN are not satisfied.

4. The host system of claim 3, wherein the host system is further configured to cause the limited use PIN to be immediately usable for facilitating the transaction.

5. The host system of claim 3, wherein the host system further comprises a conditions-of-use parameter engine which is configured to allow the first party to at least one of: select and define conditions-of-use parameters, wherein the conditions-of-use parameters place limits on how the limited use PIN may be used.

6. The host system of claim 3, wherein the host system further comprises a conditions-of-use parameter engine which is configured to establish conditions-of-use parameters, wherein the parameters place limits on how the limited use PIN may be used.

7. The host system of claim 3, wherein the host system further comprises a conditions-of-use parameter engine which is configured to establish conditions-of-use parameters, wherein the parameters place limits on how the limited use PIN may be used and the conditions of use parameters comprise at least one of: a limited use PIN credit limit, limiting use of a limited use PIN on account balance availability, a limited use PIN expiration date, a predetermined number of transactions before the limited use PIN is declined, limiting use of a limited use PIN to a specified dollar amount per transaction, limiting use of a limited use PIN to a total dollar amount for pro-designated number of transactions, whether a limited use PIN can be used to earn loyalty points, whether a limited use PIN can be used to redeem loyalty points, limiting use of a limited use PIN to a maximum dollar amount per month, use of a limited use PIN for a specified merchant only, restricting use of a limited use PIN to a specified user, and specifying that all online transactions be performed using only a limited use PIN.

8. The host system of claim 3, wherein the host system further comprises a notification engine, wherein the notification engine is configured to notify at least one of: a first party, a second party and a third party whenever the limited use PIN is used.

9. The host system of claim 3, wherein the host system further comprises an authorization system configured to authorize transaction information, wherein the transaction information includes the limited use PIN, and retrieve account information that is associated with the limited use PIN.

10. The host system of claim 3, wherein the host system further comprises a conditions-of-use parameter engine which is configured to determine whether a conditions-of-use parameter is satisfied before authorizing transaction information.

11. The host system of claim 3, wherein the host system further comprises an settlement system configured to identify the primary account that is associated with the limited use PIN, replace the limited use PIN with the primary account number, process the transaction settlement information in an accounts receivable system; and generate a billing statement that includes the primary account number.

12. An authorization system for processing authorization requests in a transaction system, the host system configured to:
receive a limited use Personal Identification Number (PIN) from a first party to facilitate a transaction with a second party, wherein said limited use PIN is generated by at least one of: an RFID device and a smartcard and, wherein the limited use PIN is configured to be immediately usable for facilitating the transaction with the second party;
associate the limited use PIN with a notification response, wherein the notification response is associated with a notification response rule relating to who to notify if the limited use PIN is used;
associate the limited use PIN with an emergency response, wherein the emergency response is associated with an emergency response rule relating to an emergency entity to notify if the limited use PIN is used;
receive transaction information from the second party for authorization, wherein the transaction information includes the limited use PIN;
forward the transaction information to a card authorization system for authorization processing;
process the transaction information with the card authorization system, wherein the card authorization system determines whether the transaction information includes the limited use PIN and interfaces with a limited use PIN system to determine whether authorization is appropriate, wherein authorization determination includes:
receiving account information associated with the account number;
determining whether conditions-of-use parameters associated with the limited use PIN are satisfied, the conditions-of-use parameters defining at least a predetermined restriction on use of the limited use PIN;
acquiring, from a database, the notification response rule corresponding to the limited use PIN;
issuing said the notification response in accordance with said notification response rule;
acquiring, from the database, the emergency response rule corresponding to the limited use PIN;
issuing the emergency response in accordance with the emergency response rule;
return an appropriate approval code to the second party, if conditions of use parameters associated with the limited use PIN and the primary account are satisfied; and
decline the authorization request if either the conditions associated with at least one of the primary account and the limited use PIN are not satisfied.

13. The authorization system of claim 12, further configured to:
receive a second party settlement request for payment of a transaction involving the limited use PIN by a first party, wherein the second party is paid if the limited use PIN is valid;
route the second party settlement request with the limited use PIN to an issuing system for authorization;
create an accounts payable file; and,
route the accounts payable file to an accounts payable system for payment processing of the second party based on the second party settlement request.

14. The settlement system of claim 13 further configured to create an accounts receivable file and route the accounts receivable file to a service that retrieves the associated primary account number and replaces the limited use PIN with the primary account PIN number and forwards the resulting accounts receivable file to an accounts receivable system to generate billing statement for the first party.

15. A user interface system configured to allow a first party to:
register with a card provider to use a transaction system;
receive a log-in to the transaction system by providing authenticating information;
receive a verification from the transaction system that the user is authorized;
designate a transaction account as a primary account;
submit a limited use Personal Identification Number (PIN) to the card provider, wherein said limited use PIN is generated by at least one of: an RFID device and a smartcard and, wherein the card provider associates the limited use PIN with the primary account;

associate the limited use PIN with a notification response, wherein the notification response is associated with a notification response rule relating to who to notify if the limited use PIN is used;

associate the limited use PIN with an emergency response, wherein the emergency response is associated with an emergency response rule relating to an emergency entity to notify if the limited use PIN is used;

submit the limited use PIN to a second party to facilitate at least one of: a payment and a receipt of cash, wherein said second party is configured to:

receive transaction information from the second party for authorization, wherein the transaction information includes the limited use PIN;

forward the transaction information to a card authorization system for authorization processing;

process the transaction information with the card authorization system, wherein the card authorization system determines whether the transaction information includes the limited use PIN and interfaces with a limited use PIN system to determine whether authorization is appropriate, wherein authorization determination includes:

receiving account information associated with the account number; and determining whether conditions-of-use parameters associated with the limited use PIN are satisfied, the conditions-of-use parameters defining at least a predetermined restriction on use of the limited use PIN;

acquiring, from a database, the notification response rule corresponding to the limited use PIN;

issuing said the notification response in accordance with said notification response rule;

acquiring, from the database, the emergency response rule corresponding to the limited use PIN;

issuing the emergency response in accordance with the emergency response rule; and return an appropriate approval code to the second party, if conditions of use parameters associated with the limited use PIN and the primary account are satisfied; and decline the authorization request if either the conditions associated with at least one of the primary account and the limited use PIN are not satisfied.

16. The user interface system of claim 15, further configured to at least one of: select and define conditions of use parameters to be associated with the limited use PIN.

17. The user interface system of claim 15, wherein said primary account is a non-currency based account.

18. The user interface system of claim 15, wherein said primary account associated with an electronic line of credit system.

* * * * *